United States Patent
Chen et al.

(10) Patent No.: US 6,687,725 B1
(45) Date of Patent: Feb. 3, 2004

(54) ARITHMETIC CIRCUIT FOR FINITE FIELD GF ($2^M$)

(75) Inventors: Tung-Chou Chen, Chu-Pei (TW); Shyue-Win Wei, Hsinchu (TW); Hung-Jen Tsai, Hsinchu (TW)

(73) Assignee: Shyue-Win Wei, Hsinchu (TW)

( * ) Notice: Subject to any disclaimer, the term of this patent is extended or adjusted under 35 U.S.C. 154(b) by 663 days.

(21) Appl. No.: 09/605,100

(22) Filed: Jun. 23, 2000

(51) Int. Cl.$^7$ .............................................. G06F 7/00
(52) U.S. Cl. ...................................................... 708/492
(58) Field of Search .................................. 708/491, 492

(56) References Cited

U.S. PATENT DOCUMENTS

| | | | | |
|---|---|---|---|---|
| 5,046,037 A | * | 9/1991 | Cognault et al. ............ | 708/492 |
| 5,890,800 A | * | 4/1999 | Meyer ......................... | 708/492 |
| 6,044,389 A | * | 3/2000 | Weng et al. ................. | 708/492 |
| 6,141,786 A | * | 10/2000 | Cox et al. ................... | 714/763 |
| 6,230,179 B1 | * | 5/2001 | Dworkin et al. ............ | 708/492 |

OTHER PUBLICATIONS

Lin, Shu, "Error Control Coding: Fundamentals and Applications", Chapter 2, pp. 15–48, Prentice–Hall, N.J. 1983.
Yeh, C.–S., *IEEE Transactions on Computers*, vol. C–33:4, 357–360, Apr. 1984.
Wang, Charles C. et al., *IEEE Transactions on Computers*, vol. C–34:8, 709–717, Aug. 1985.
Okano, Hiorkazu et al., *IEEE Transactions on Computers*, vol. C–36:10, 1165–1171, Oct. 1987.
Araki, Kiyomichi et al., *TheTransactions of the IEICE*, vol. E72: 11, 1230–1234, Nov. 1989.
Scott, P. Andrew et al., *IEEE Journal on Selected Areas in Communications*, vol. 6:3, 578–586, Apr. 1988.
Wang, Charles C., *IEEE Transactions on Computers*, vol. 39:2, 258–262, Feb. 1990.
Rao, T.R.N. et al., "Error–Control Coding for Computer Systems", Chapter 2, pp. 15–45, Prentice–Hall, N.J. 1989.
Michelson, Arnold M. et al., "Error–Control Techniques for Digital Communication", Chapter 4, pp. 98–109 and 190–196, John Wiley & Sons, NY 1985.
Blahut, Richard E., "Theory and Practice of Error Control Codes", Chapter 4, pp. 65–90, Addison–Wesley Publishing Company, Massachusetts 1983.
Laws, B.A., Jr. et al., *IEEE Transactions on Computers*, Short Notes, 1573–1578, Dec. 1971.

* cited by examiner

*Primary Examiner*—Chuong Dinh Ngo
(74) *Attorney, Agent, or Firm*—Darby & Darby

(57) ABSTRACT

An arithmetic unit which performs all basic arithmetic operations in a finite field GF($2^m$) and includes an arithmetic processor, an arithmetic logic unit and a control unit is disclosed. The arithmetic unit of the present invention is structured with a low circuit complexity, so that an error-correcting decoder applying this calculating processor can be greatly simplified.

10 Claims, 15 Drawing Sheets

ARITHMETIC CIRCUIT FOR FINITE FIELD GF ($2^M$)

BACKGROUND OF THE INVENTION

1. Field of the Invention

The present invention relates to an arithmetic circuit for performing all arithmetic operations in a finite field GF($2^m$).

2. Description of the Related Art

In recent years, finite fields have attracted much attention in computer and communication applications. For instance, forward error-correction codes have been widely used in digital communications. However, to design an error-correction circuit with both a high operation speed and a low circuit complexity, it is a necessity to have a multi-function arithmetic circuit. Therefore, there is a trend, when designing the multi-function arithmetic circuit, to reduce its complexity, shorten its calculating delay and increase its operation speed. As any skilled person knows, addition, multiplication, division, exponentiation and inverse multiplication are the most basic arithmetic operations in a finite field. To perform these arithmetic operations, several kinds of circuits have been proposed on different bases, such as dual basis, normal basis and standard basis. Usually, arithmetic operations on dual basis and normal basis need extra transformations, while arithmetic operations on standard basis need no more transformations. Consequently, the arithmetic circuit of the present invention applies the standard basis although some arithmetic operations are best implemented on dual basis or normal basis.

In a finite field GF($2^m$), an adder on standard basis is easily implemented by m XOR gates, and a parallel-in-parallel-out multiplier on standard basis is first implemented by B. A. Laws, Jr and C. K. Rushforth, see "A cellular-array multiplier for finite fields GF($2^m$)" in IEEE trans. Corput., vol.C-20, pp. 1573–1578, 1971. Further, to increase the operation speed of the cellular-array multiplier, another systolic-array product-sum multiplier is also disclosed by C. S. Yeh, Irving S. Reed and T. K. Truong, see "Systolic multipliers for finite fields GF($2^m$)" in IEEE trans. Comput., vol. C-33, pp.357–360, 1984. Comparing the operation speeds of these two multipliers, a multiplication needs $2^m$ gate delays in the cellular-array multiplier and one celltime delays (about two gate delays) in the systolic-array product-sum multiplier. However, the circuit complexity of the systolic-array product-sum multiplier is far more complicated than that of the cellular-array multiplier. Also, the first input of the systolic-array product-sum multiplier has a latency (about 3 m celltime delays) before the first output is obtained, it is also improper to apply the systolic-array product-sum multiplier in a pipeline-structured circuit.

Theoretically, division in a finite field GF($2^m$) is implemented by a multiplication and an inverse multiplication, i.e., A/B=A*$B^{-1}$, where A and B are elements in the finite field GF($2^m$). Inverse multiplication can be implemented by using a ROM table, applying Euclid's rule or combining a series of multiplications. Nowadays, inverse multiplication is mostly implemented on normal basis because square can be implemented by a simple cyclic shifting. Similarly, exponentiation can be also implemented by using a ROM table or combining a series of multiplication. Following is a list of references:

[1] B. A. Laws, m Jr., and C. K. Rushforth, "A cellular-array multipliers for finite fields GF($2^m$)," *IEEE Trans. Comput.*, vol. C-20, pp. 1573–1578, 1971.

[2] C. -S. Yeh, Irving S. Reeds and T. K. Truong, "Systolic multipliers for finite fields GF($2^m$)," *IEEE Trans. Comput.*, vol. C-33, pp. 357–360, 1984.

[3] C. C. Wang, T. K. Truong, H. M. Shao, L. J. Dentsch, J. K. Omura, and I. S. Reed. "VLSI architectures for computing multiplications and inverses in GF($2^m$)." *IEEE Trans. Comput.*, vol. C-34, pp. 709–716, 1985.

[4] H. Okano, and H. Imai "A construction method of high-speed decoders using ROM's for Bose-Chaudhuri-Hocquenghem and Reed-Solomon codes," *IEEE Trans. Comput.*, vol. C-36, pp. 1165–1171, 1987.

[5] K. Araki, I. Fujita, and M. Morisue "Fast inverter over finite field based in Euclid's algorithm," *Trans. IEICE*, vol. E-72, pp. 1230–1234, November 1989.

[6] P. A. Scott, S. J. Simmons, S. E. Tavares, and L. E. Peppard, "Architectures for exponentiation in GF($2^m$)," *IEEE J. Selected Areas in Commun.*, vol. 6, No. 3, pp. 578–586, April 1988.

[7] C. C. Wang, and D. Pei, "A VLSI design for computing exponentiations in GF($2^m$) and its application to generate pseudorandom number sequences," *IEEE Trans. Comput.*, vol. C-39, No.2 pp. 258–262, February 1990.

Wei has also proposed another cellular-array power-sum circuit in 1996, for performing $AB^2+C$, where A, B and C are elements in the finite field GF($2^m$). Under this structure, other arithmetic circuits for performing exponentiation, inverse multiplication and division are also disclosed.

However, the mentioned arithmetic circuits are respectively designed for a specific arithmetic operation, which is never enough, for example, a forward error-correction decoder. In a finite field GF($2^m$), an arithmetic circuit with high-speed, low complexity, and versatile features is required. For example, the decoding process of Peterson's direct solution method for decoding the 3-error-correcting Reed-Solomon code are:

(i) Calculate the syndrome value of the received word, $$S_i = r(\alpha^i) = r_0 + r_1 \cdot (\alpha^i) + r_2 \cdot (\alpha^i)^2 + \ldots r_{n-1} \cdot (\alpha^i)^{n-1}, \text{ where } i=1, 2, 3, 4, 5, 6.$$

(ii) Determine error-location polynomial σ(X) from the syndrome values. For example, if there are 3 errors in the received word, the error-location polynomial $$\sigma(X) = X^3 + \sigma_1 X^2 + \rho_2 X + \sigma_3, \text{ where}$$

$$\sigma_1 = \frac{S_1 S_3 S_6 + S_1 S_4 S_5 + S_2^2 S_6 + S_2 S_3 S_5 + S_2 S_4^2 + S_3^2 S_4}{S_1 S_3 S_5 + S_1 S_4^2 + S_2^2 S_5 + S_3^3}$$

$$\sigma_2 = \frac{S_1 S_4 S_6 + S_1 S_5^2 + S_2 S_3 S_6 + S_2 S_4 S_5 + S_3^2 S_5 + S_3 S_4^2}{S_1 S_3 S_5 + S_1 S_4^2 + S_2^2 S_5 + S_3^3}$$

$$\sigma_3 = \frac{S_2 S_4 S_6 + S_2 S_5^2 + S_3^2 S_6 + S_4^3}{S_1 S_3 S_5 + S_1 S_4^2 + S_2^2 S_5 + S_3^3}$$

(iii) Find the roots of the error-location polynomial σ(X) to obtain error locators.

(iv) Calculate error values at each error locator. For example, if the error locators are $X_1$, $X_2$ and $X_3$, the error values are respectively:

$$Y_1 = \frac{S_1 X_2^2 X_3^3 + S_2 X_2^3 X_3 + S_3 X_2 X_3^3 + S_1 X_2^3 X_3^2 + S_2 X_2 X_3^3 + S_3 X_2^2 X_3}{X_1 X_2^2 X_3^3 + X_1^3 X_2 X_3^2 + X_1^2 X_2^3 X_3 + X_1^3 X_2^2 X_3 + X_1 X_2^3 X_3^2 + X_1^2 X_2 X_3^3}$$

-continued $$Y_2 = \frac{S_1 X_3^2 X_1^3 + S_2 X_1 X_3^3 + S_3 X_1^2 X_3 + S_1 X_1^2 X_3^3 + S_2 X_1^3 X_3 + S_3 X_1 X_3^2}{X_1 X_2^2 X_3^3 + X_1^3 X_2 X_3^2 + X_1^2 X_2^3 X_3 + X_1^3 X_2^2 X_3 + X_1 X_2^3 X_3^2 + X_1^2 X_2 X_3^3}$$

$$Y_3 = \frac{S_1 X_1^2 X_2^3 + S_2 X_1^3 X_2 + S_3 X_1 X_2^2 + S_1 X_1^3 X_2^2 + S_2 X_1 X_2^3 + S_3 X_1^2 X_2}{X_1 X_2^2 X_3^3 + X_1^3 X_2 X_3^2 + X_1^2 X_2^3 X_3 + X_1^3 X_2^2 X_3 + X_1 X_2^3 X_3^2 + X_1^2 X_2 X_3^3}$$

Thus, the received word can be corrected with reference to the calculated error value, and the decoding procedure is accomplished, (see "*Error-Control Techniques for Digital Communication*" by A. M. Michelson and A. H. Levesque in 1985 and "*Error Control Coding*" by S. Lin and D. J. Costellor in 1983).

To solve the above mentioned problems, it is an object of the present invention to provide an arithmetic circuit which can perform all arithmetic operations in the finite field, including addition, multiplication, division, exponentiation and inverse multiplication.

SUMMARY OF THE INVENTION

It is an object of the present invention to provide an arithmetic circuit, which can perform all basic arithmetic operations in a finite field GF($2^m$), including addition, multiplication, division, exponentiation and inverse multiplication. The arithmetic circuit of the present invention is structured with a low circuit complexity, so that an error-correction decoder applying this arithmetic circuit can be greatly simplified.

BRIEF DESCRIPTION OF THE DRAW

Other features and advantages of the present invention will become apparent in the following detailed description of the preferred embodiment with reference to the accompanying drawings, in which.

DETAILED DESCRIPTION OF THE PREFERRED EMBODIMENT

A finite field is first explained as follows.

Finite Field GF($2^m$)

A finite field GF($2^m$) consists of $2^m$ elements $\{0, 1=\alpha^0=\alpha^n, \alpha^1, \alpha^2, \ldots, \alpha^{n-1}\}$, where $n=2^{m-1}$ and $\alpha$ is a primitive element which is a root of the primitive polynomial. If the smallest position integer n for which an irreducible polynomial F(x) with degree m divides $X^n+1$ is $n=2^m-1$, the polynomial F(x) is called a primitive polynomial. In this case, the primitive polynomial of the finite field GF($2^m$) is expressed as $F(x)=x^m+f_{m-1}x^{m-1}+f_{m-2}x^{m-2}+ \ldots +f_1x+1$, where $f_i=0$ or 1 and $i=1$~$m-1$.

Generally, elements in a finite field GF($2^m$) can be represented in two ways. One is the power representation, i.e., GF($2^m$)=$\{0,1,\alpha^1,\alpha^2,\ldots,\alpha^{n-1}\}$, wherein $1=^0=^n$. The primitive element $\alpha$ is a root of the primitive polynomial. F(x), F($\alpha$)=0. Therefore, $\alpha^n+1=0$ and then $\alpha^n=1$, because $X^n+1$ can be completely divided by F(x). This makes the finite field GF($2^m$) is closed under the addition and multiplication. That is, outcomes of addition and multiplication over GF($2^m$) are also elements in the finite field GF($2^m$). Further, another modulo polynomial $\alpha^m=f_{m-1}\alpha^{m-1}+f_{m-2}\alpha^{m-2}+ \ldots +f_1\alpha+1$ can be also obtained when F($\alpha$)=0. By this, an element in the finite field GF($2^m$) can be also expressed as a polynomial with degree m-1 or less, which is called polynomial representation. This is very useful because a polynomial with degree m-1 can be implemented by an m-bit vector. Following is a list of references.

[1] T. R. N. Rao and E. Fujiwara, *Error-Control Coding for Computer Systems*. NJ: Pretice-Hall, 1989.

[2] R. E. Blahut, *Theory and Practice of Error Control Codes*. Reading, M A: Addison-Wesley, 1983.

[3] A. M. Michelson, A. H. Levesque, *Error-Control Techniques for Digital Communication*. John Wiley & Sons, Inc., 1985.

[4] S. Lin, and D. J. Costellor, Jr., *Error Control Coding*. Prentice Hall, 1983.

Arithmetic Unit (AU)

Figure 1:
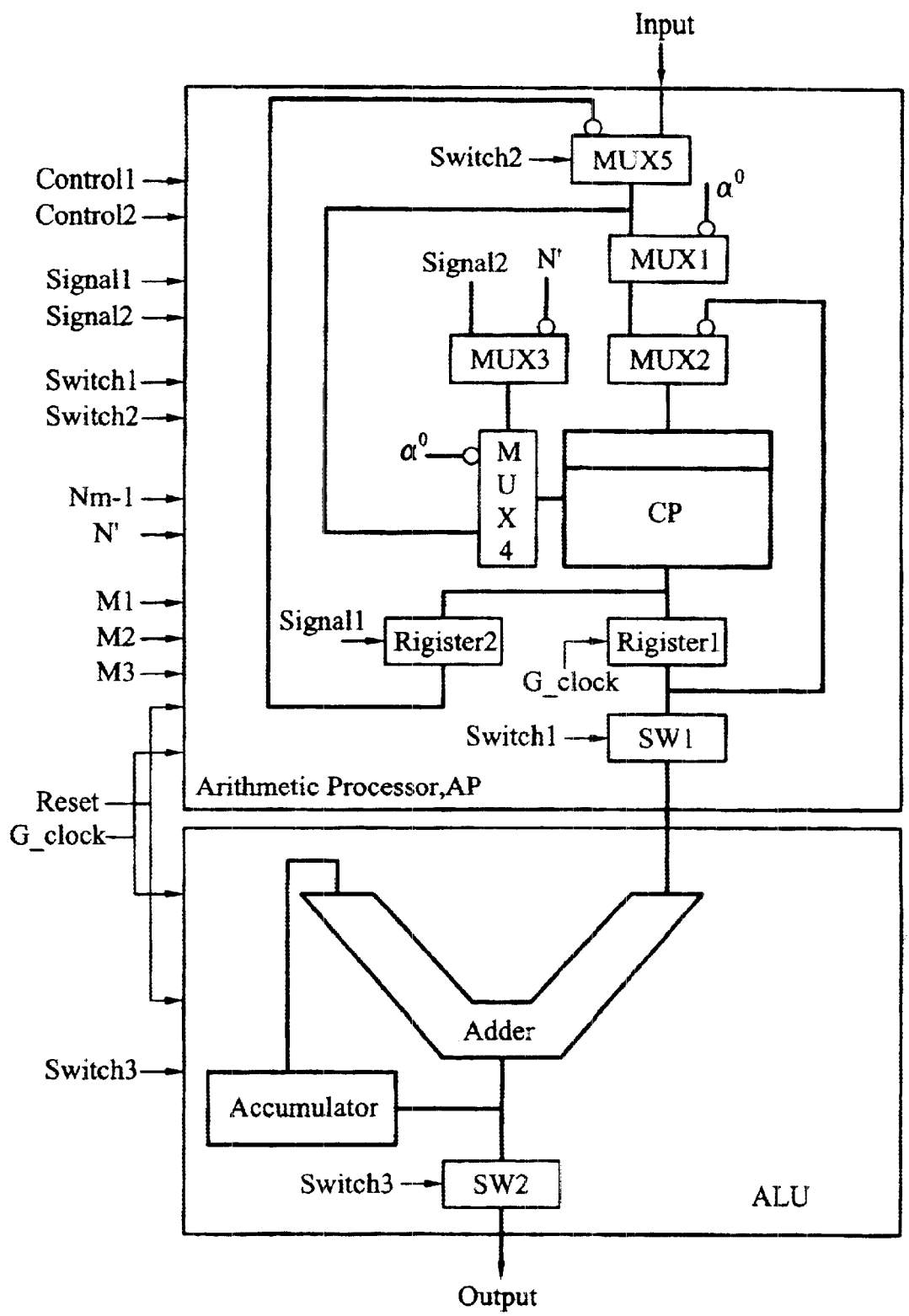
FIG. 1 is a structure diagram showing an arithmetic circuit of the present invention.

This arithmetic unit includes an arithmetic processor (AP), an arithmetic logic unit (ALU) and control circuits. Therein the arithmetic processor is structured on a calculating processor (CP) which can perform the A*B and A*$B^2$ operations in the finite field GF($2^m$), where A and B are elements in the finite field GF($2^m$). Based on this calculating processor, multiplication, division, exponentiation and inverse multiplication can be performed on this calculating processor. The major job of the arithmetic logic unit is provided to perform addition in the finite field GF($2^m$). Adding the control circuits, all arithmetic operations in the finite field GF($2^m$) can be completed using this arithmetic unit, see FIG. 1.

Calculating Processor (CP)

Figure 2A:
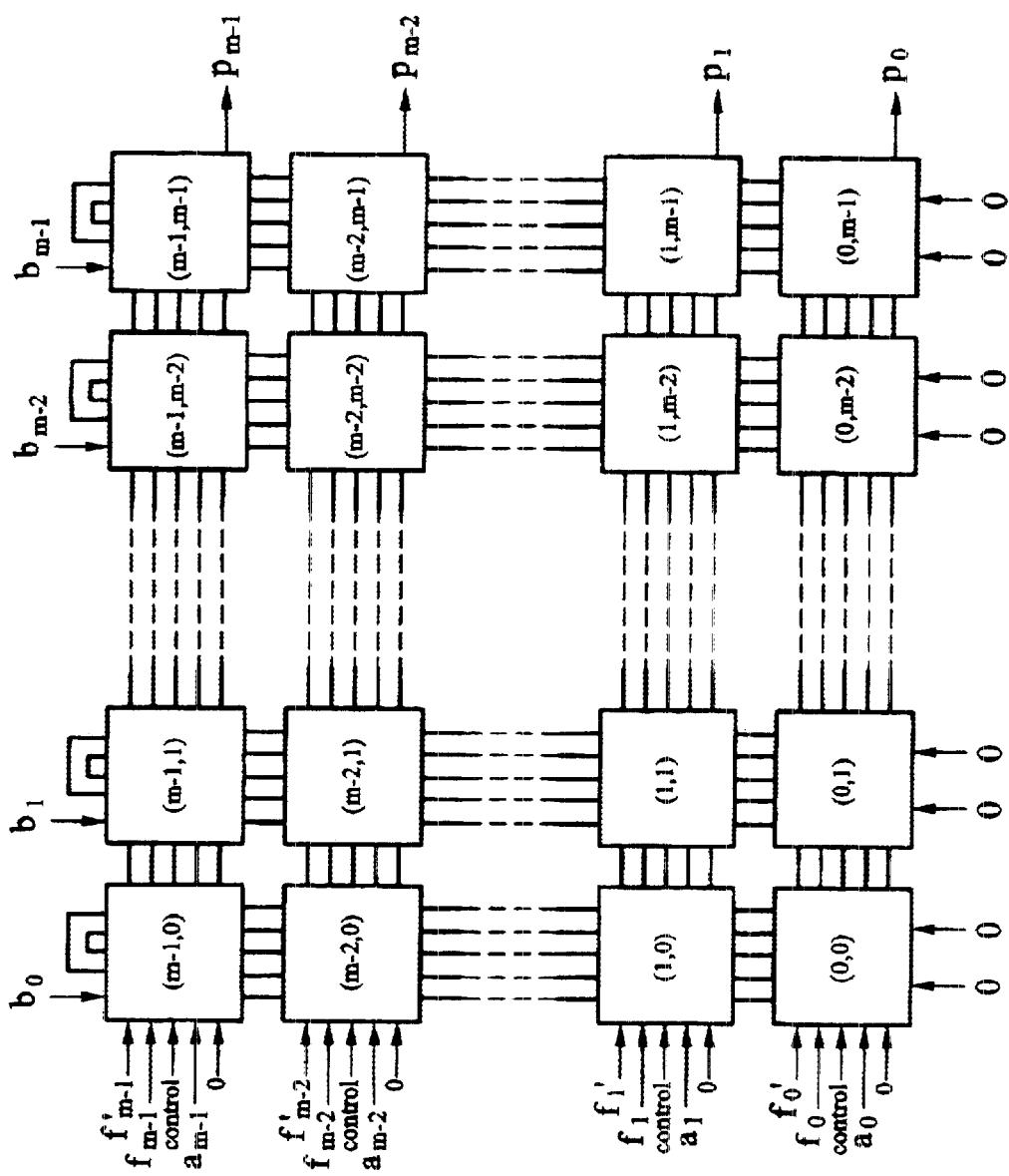
FIG. 2A is a structure diagram showing a calculating processor in the arithmetic circuit of the present invention.
Figure 2B:
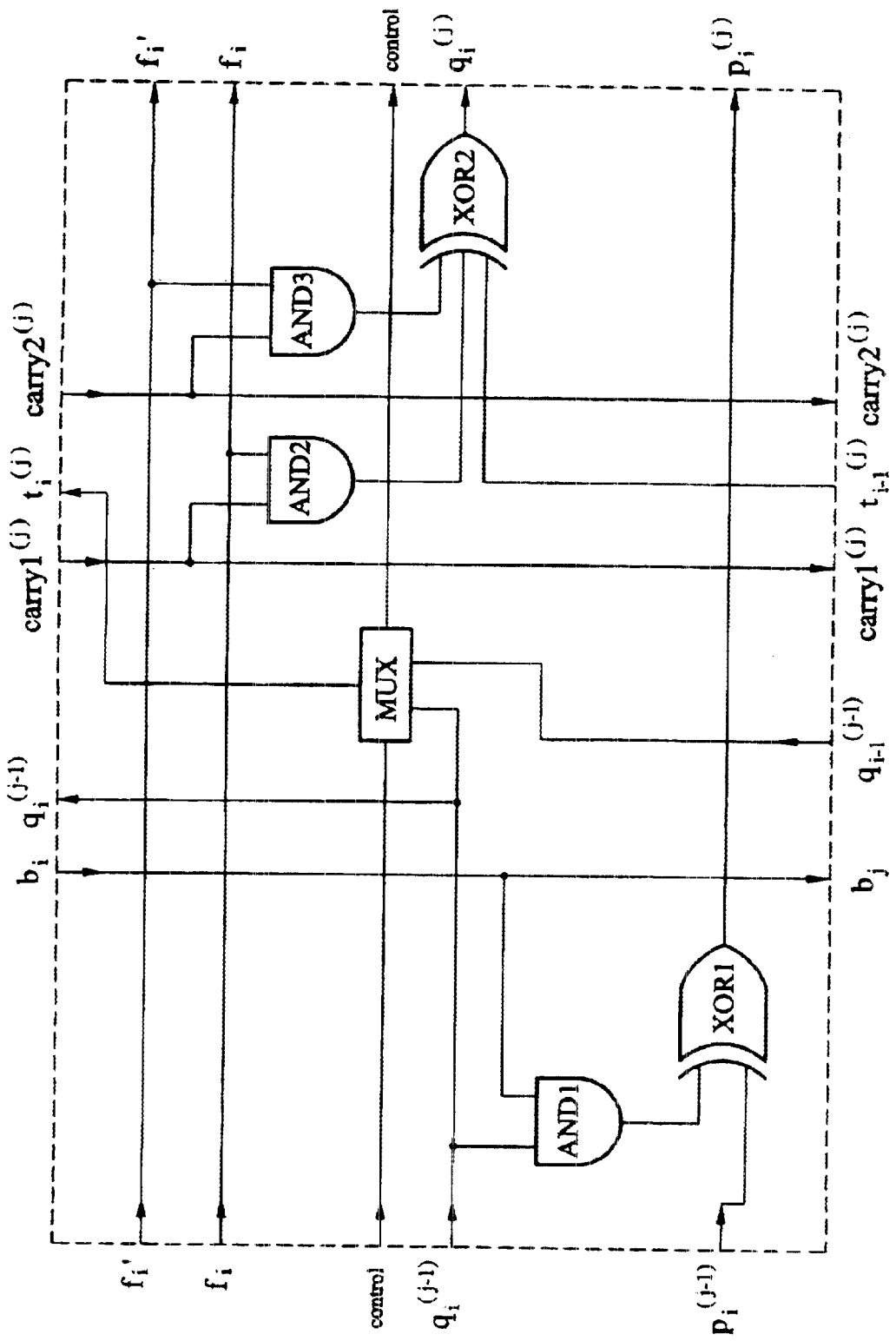
FIG. 2B is a circuit diagram showing the [i,j] identity cell in the calculating processor in FIG. 2A.

This calculating processor is provided to perform A*B and A*$B^2$ in the finite field GF($2^m$), which includes an array of m×m identity cells. Each identity cell includes three two-input AND gates, one two-input XOR gate, one three-input XOR gate and a multiplexer (see FIG. 2A and FIG. 2B). In this calculating processor, what arithmetic operation this calculating processor wants to perform is decided by a control signal Control. Assume two input elements A and B are respectively expressed as:

$$A=[a_{m-1},a_{m-2},\ldots,a_1,a_0]=a_{m-1}\alpha^{m-1}+a_{m-2}\alpha^{m-2}+\ldots+a_1\alpha+a_0$$

$$B=[b_{m-1},b_{m-2},\ldots,b_1,b_0]=b_{m-1}\alpha^{m-1}+b_{m-2}\alpha^{m-2}+\ldots+b_1\alpha+b_0$$

And the primitive polynomial $F(x)=x^m+f_{m-1}x^{m-1}+\ldots+f_2x^2+f_1x+f_0$, where $f_i$ ($0<=i<=m-1$) are the coefficients of the primitive polynomial. This calculating processor performs the A*B operation when Control=0. At this time, $f'_i=0$, $0<=i<=m-1$. Further, this calculating process or performs the $A*B^2$ operation when Control=1. At this time, $f'_i=f_{m-1}\cdot f_i+f_{i-1}$, $1<=i<=m-1$ and $f'_0=f_{m-1}\cdot f_0$. The outcome of this calculating processor is:

$$P = [p_{m-1}, p_{m-2}, \ldots, p_1, p_0]$$
$$= p_{m-1}\alpha^{m-1} + p_{m-2}\alpha^{m-2} + \ldots + p_1\alpha + p_0$$
$$= \begin{cases} A \cdot B & control = 0 \\ AB^2 & control = 1 \end{cases}$$

<1>AB Operation

When Control=0, the input signal $f_i=0$, $0<=i<=m-1$. As a result, the AND gates AND3 in each identity cell outputs a 0's, and the multiplexer MUK output $t_i^{(j)}=q_i^{(j-1)}$. Accordingly, for the [i,j] identity cell, $$\text{Carry1}^{(j)}=q_{m-1}^{(j-1)}$$

$$q_i^{(j)}=\text{carry1}^{(j)}\cdot f_i+t_{i-1}^{(j)}=q_{m-1}^{(j-1)}\cdot f_i+q_{i-1}^{(j-1)}$$

$$p_i^{(j)}=p_i^{(j-1)}+q_i^{(j-1)}\cdot b_j$$

and the output $Q^{(j)}$ of the m identity cells in the $j^{th}$ column is:

$$Q^{(j)} = \sum_{i=0}^{m-1} q_i^{(j)} \cdot \alpha^i \quad 0 \le j \le m-1$$

For example, $$Q^{(0)} = \sum_{i=0}^{m-1} q_i^{(0)} \cdot \alpha^i$$

$$= \sum_{i=0}^{m-1} (q_{m-1}^{(-1)} \cdot f_i + q_{i-1}^{(-1)}) \cdot \alpha^i$$

$$= \left[\sum_{i=0}^{m-2} q_{m-1}^{(-1)} \cdot f_i \cdot \alpha^i\right] + \left[\sum_{i=0}^{m-1} q_{i-1}^{(-1)} \cdot \alpha^i\right]$$

$$= a_{m-1} \cdot \left[\sum_{i=0}^{m-1} f_i \cdot \alpha^i\right] + \left[\sum_{i=0}^{m-2} q_i^{(-1)} \cdot \alpha^{i+1}\right]$$

$$= a_{m-1} \cdot \alpha^m + \sum_{i=0}^{m-2} a_i \cdot \alpha^{i+1}$$

$$= \left[\sum_{i=0}^{m-2} a_i \cdot \alpha^i\right] \cdot \alpha$$

$$= A \cdot \alpha$$

$$Q^{(1)} = \sum_{i=0}^{m-1} q_i^{(1)} \cdot \alpha^i$$

$$= \sum_{i=0}^{m-1} (q_{m-1}^{(0)} \cdot f_i + q_{i-1}^{(0)}) \cdot \alpha^i$$

$$= q_{m-1}^{(0)} \cdot \left[\sum_{i=0}^{m-1} f_i \cdot \alpha^i\right] + \left[\sum_{i=0}^{m-2} q_i^{(0)} \cdot \alpha^{i+1}\right]$$

$$= q_{m-1}^{(0)} \cdot \alpha^m + \sum_{i=0}^{m-2} q_i^{(0)} \cdot \alpha^{i+1}$$

$$= \left[\sum_{i=0}^{m-1} q_i^{(0)} \cdot \alpha^i\right] \cdot \alpha$$

$$= Q^{(0)} \cdot \alpha = (A \cdot \alpha) \cdot \alpha = A \cdot \alpha^2$$

From above, the output $Q^{(j)}$ of the m identity cells in the $j^{th}$ column of the calculating processor can be simplified to:

$$Q^{(j)} = \sum_{i=0}^{m-1} q_i^{(j)} \cdot \alpha^i$$

$$= \sum_{i=0}^{m-1} (q_{m-1}^{(j-1)} \cdot f_i + q_{i-1}^{(j-1)}) \cdot \alpha^i$$

$$= \left[\sum_{i=0}^{m-1} q_{m-1}^{(j-1)} \cdot f_i \cdot \alpha^i\right] + \left[\sum_{i=0}^{m-1} q_{i-1}^{(j-1)} \cdot \alpha^i\right]$$

$$= q_{m-1}^{(j-1)} \cdot \left[\sum_{i=0}^{m-1} f_i \cdot \alpha^i\right] + \left[\sum_{i=0}^{m-2} q_i^{(j-1)} \cdot \alpha^{i+1}\right]$$

$$= q_{m-1}^{(j-1)} \cdot \alpha^m + \sum_{i=0}^{m-2} q_i^{(j-1)} \cdot \alpha^{i+1}$$

$$= \left[\sum_{i=0}^{m-1} q_i^{(j-1)} \cdot \alpha^i\right] \cdot \alpha$$

$$= Q^{(j-1)} \cdot \alpha$$

$$= (Q^{(j-2)} \cdot \alpha) \cdot \alpha$$

$$\vdots$$

$$= Q^{(0)} \cdot \alpha^j = A \cdot \alpha^{j+1}$$

Similarly, the output $P^{(j)}$ of the m identity cells in the $j^{th}$ column of the calculating processor is:

$$P^{(j)} = \sum_{i=0}^{m-1} p_i^{(j)} \cdot \alpha^i \quad o \ j \ m-1$$

For example, $$P^{(0)} = \sum_{i=0}^{m-1} (p_i^{(-1)} + q_i^{(-1)} \cdot b_0) \cdot \alpha^i$$

$$= \left[\sum_{i=0}^{m-1} p_i^{(-1)} \cdot \alpha^i\right] + \left[\sum_{i=0}^{m-1} q_i^{(-1)} \cdot \alpha^i\right] \cdot b_0$$

$$= \left[\sum_{i=0}^{m-1} 0 \cdot \alpha^i\right] + \left[\sum_{i=0}^{m-1} a_i \cdot \alpha^i\right] \cdot b_0$$

$$= A \cdot b_0$$

(where the input signal $p_i^{(-1)}$ of the m identity cells in the first row is 0, 0 i m−1)

$$P^{(1)} = \sum_{i=0}^{m-1} (p_i^{(0)} + q_i^{(0)} \cdot b_1) \cdot \alpha^i$$

$$= \left[\sum_{i=0}^{m-1} p_i^{(0)} \cdot \alpha^i\right] + \left[\sum_{i=0}^{m-1} q_i^{(0)} \cdot \alpha^i\right] \cdot b_1$$

$$= P^{(0)} + Q^{(0)} \cdot b_1$$

$$= A \cdot b_0 + (A \cdot \alpha) \cdot b_1$$

$$= A \cdot (b_0 + b_1 \alpha)$$

$$P^{(2)} = \sum_{i=0}^{m-1} (p_i^{(1)} + q_i^{(1)} \cdot b_2) \cdot \alpha^i$$

$$= \left[\sum_{i=0}^{m-1} p_i^{(1)} \cdot \alpha^i\right] + \left[\sum_{i=0}^{m-1} q_i^{(1)} \cdot \alpha^i\right] \cdot b_1$$

$$= P^{(1)} + Q^{(1)} \cdot b_2$$

$$= P^{(0)} + Q^{(0)} \cdot b_1 + Q^{(1)} \cdot b_2$$

$$= A \cdot b_0 + (A \cdot \alpha) \cdot b_1 + (A \cdot \alpha^2) \cdot b_2$$

$$= A \cdot (b_0 + b_1 \alpha + b_2 \alpha^2)$$

From above, the output $P^{(j)}$ of the m identity cells in the $j^{th}$ column of the calculating processor can be simplified to:

$$P^{(j)} = \sum_{i=0}^{m-1} (p_i^{(j-1)} + q_i^{(j-1)} \cdot b_j) \cdot \alpha^1$$

$$= \left[\sum_{i=0}^{m-1} p_i^{(j-1)} \cdot \alpha^1\right] + \left[\sum_{i=0}^{m-1} q_i^{(j-1)} \cdot \alpha^1\right] \cdot b_j$$

$$= P^{(j-1)} + Q^{(j-1)} \cdot b_j$$

$$= (P^{(0)} + Q^{(0)} \cdot b_1 + \ldots + Q^{(j-2)} \cdot b_{j-1}) + Q^{(j-1)} \cdot b_j$$

$$= A \cdot b_0 + (A \cdot \alpha) \cdot b_1 + \ldots + (A \cdot \alpha^{j-1}) \cdot b_{j-1} + (A \cdot \alpha^1) \cdot b_j$$

$$= A \cdot (b_0 + b_1 \alpha + \ldots + b_{j-1} \alpha^{j-1} + b_j \alpha^j)$$

$$= A \cdot \left(\sum_{k=0}^{j} b_k \cdot \alpha^k\right)$$

According to this rule, the output of the last column (the output of the calculating processor) is:

$$P = \sum_{i=0}^{m-1} p_i \cdot \alpha^i$$

$$= \sum_{i=0}^{m-1} p_i^{(m-1)} \cdot \alpha^i$$

$$= P^{(m-1)}$$

$$= A \cdot \left(\sum_{k=0}^{m-1} b_k \cdot \alpha^k\right)$$

$$= A \cdot B$$

Thus, the calculating processor performs the A*B operation when Control=0.

<2> AB² Operation

When Control=1, the multiplexer MUX of each identity cell output $t_i^{(j)} = q_{i-1}^{(j-1)}$, Accordingly, $$\text{carry1}^{(j)} = q_{m-2}^{(j-1)}$$

$$\text{carry2}^{(j)} = q_{m-1}^{(j-1)}$$

And for the [i,j] identity cell, $$q_i^{(j)} = \text{carry1}^{(j)} \cdot f_i + \text{carry2}^{(j)} \cdot f_i' + t_{i-1}^{(j)}$$

$$= q_{m-2}^{(j-1)} \cdot f_i + q_{m-1}^{(j-1)} \cdot f'_1 + q_{i-2}^{(j-1)}$$

$$p_i^{(j)} = p_i^{(j-1)} + q_i^{(j-1)} \cdot b_j$$

Then $$Q^{(0)} = \sum_{i=0}^{m-1} q_i^{(0)} \cdot \alpha^i$$

$$= \sum_{i=0}^{m-1} (\text{carry1}^{(0)} \cdot f_i + \text{carry2}^{(0)} \cdot f_i' + t_{i-1}^{(0)}) \cdot \alpha^i$$

$$= \sum_{i=0}^{m-1} (q_{m-2}^{(-1)} \cdot f_i + q_{m-1}^{(-1)} \cdot f_i' + q_{i-2}^{(-1)}) \cdot \alpha^i$$

$$= \left[\sum_{i=0}^{m-1} a_{m-2} \cdot f_i \cdot \alpha^i\right] + \left[\sum_{i=0}^{m-1} a_{m-1} \cdot f_i' \cdot \alpha^i\right] + \left[\sum_{i=0}^{m-1} a_{i-2} \cdot \alpha^i\right]$$

$$= a_{m-2} \cdot \left[\sum_{i=0}^{m-1} f_i \cdot \alpha^i\right] + a_{m-1} \cdot \left[\sum_{i=0}^{m-1} f_i' \cdot \alpha^i\right] + \left[\sum_{i=2}^{m-1} a_{i-2} \cdot \alpha^{i+1}\right]$$

wherein $$\sum_{i=0}^{m-1} f_i' \cdot \alpha^i = \left(\sum_{i=0}^{m-1} f_{m-1} \cdot f_i \cdot \alpha^i\right) + \left(\sum_{i=1}^{m-1} f_{i-1} \cdot \alpha^i\right)$$

$$= f_{m-1} \cdot \left(\sum_{i=1}^{m-1} f_i \cdot \alpha^i\right) + \left(\sum_{i=0}^{m-2} f_i \cdot \alpha^{i+1}\right)$$

$$= f_{m-1} \cdot \alpha^m + \left(\sum_{i=1}^{m-2} f_i \cdot \alpha^{i+1}\right)$$

$$= \left(\sum_{i=0}^{m-1} f_i \cdot \alpha^{i+1}\right)$$

$$= \left(\sum_{i=0}^{m-1} f_i \cdot \alpha^i\right) \cdot \alpha$$

$$= \alpha^m \cdot \alpha$$

$$= \alpha^{m+1}$$

Therefore, the output $Q^{(j)}$ of the m identity cells in the $j^{th}$ column of the calculating processor is:

$$Q^{(0)} = a_{m-2} \cdot \left[\sum_{i=0}^{m-1} f_i \cdot \alpha^i\right] + a_{m-1} \cdot \left[\sum_{i=0}^{m-1} f_i' \cdot \alpha^i\right] + \left[\sum_{i=2}^{m-1} a_{i-2} \cdot \alpha^i\right]$$

$$= a_{m-2} \cdot \alpha^m + a_{m-1} \cdot \alpha^{m+1} + \sum_{i=0}^{m-3} a_i \cdot \alpha^{i=2}$$

$$= \sum_{i=0}^{m-1} a_i \cdot \alpha^{i+2}$$

$$= \left(\sum_{i=0}^{m-1} a_i \cdot \alpha^i\right) \cdot \alpha^2$$

$$= A \cdot \alpha^2$$

$$Q^{(1)} = \sum_{i=0}^{m-1} q_i^{(1)} \cdot \alpha^i$$

$$= \sum_{i=0}^{m-1} (\text{carry1}^{(1)} \cdot f_i + \text{carry2}^{(1)} \cdot f_i' + t_{i-1}^{(1)}) \cdot \alpha^i$$

$$= q_{m-2}^{(0)} \cdot \left[\sum_{i=0}^{m-1} f_i \cdot \alpha^i\right] + q_{m-1}^{(0)} \cdot \left[\sum_{i=0}^{m-1} f'_i \cdot \alpha^i\right] + \left[\sum_{i=2}^{m-1} q_{i-2}^{(0)} \cdot \alpha^i\right]$$

$$= q_{m-2}^{(0)} \cdot \alpha^m + q_{m-1}^{(0)} \cdot \alpha^{m+1} + \sum_{i=0}^{m-3} q_i^{(0)} \cdot \alpha^{i+2}$$

$$= \sum_{i=0}^{m-1} q_i^{(0)} \cdot \alpha^{i+2}$$

$$= \left(\sum_{i=0}^{m-1} q_i^{(0)} \cdot \alpha^i\right) \cdot \alpha^2$$

$$= Q^{(0)} \cdot \alpha^2$$

$$= A \cdot \alpha^4$$

From above, the output $Q^{(j)}$ of the m identity cells in the $j^{th}$ column of the calculating processor can be simplified to:

$$Q^{(j)} = \sum_{i=0}^{m-1} q_i^{(j)} \cdot \alpha^i$$

$$= \sum_{i=0}^{m-1} (carry1^{(j)} \cdot f_i + carry2^{(j)} \cdot f'_i + t_{i-1}^{(1)}) \cdot \alpha^i$$

$$= q_{m-2}^{(j-1)} \cdot \left[\sum_{i=0}^{m-1} f_i \cdot \alpha^i\right] + q_{m-1}^{(j-1)} \cdot \left[\sum_{i=0}^{m-1} f'_i \cdot \alpha^i\right] + \left[\sum_{i=0}^{m-1} q_{i-2}^{(j-1)} \cdot \alpha^i\right]$$

$$= q_{m-2}^{(j-1)} \cdot \alpha^m + q_{m-1}^{(j-1)} \cdot \alpha^{m+1} + \sum_{i=0}^{m-3} q_i^{(j-1)} \cdot \alpha^{i+2}$$

$$= \sum_{i=0}^{m-1} q_i^{(j-1)} \cdot \alpha^{i+2}$$

$$= Q^{(j-1)} \cdot \alpha^2$$

$$= Q^{(j-2)} \cdot \alpha^2 \cdot \alpha^2$$

$$\vdots$$

$$= Q^{(0)} \cdot \alpha^{2j}$$

$$= A \cdot \alpha^{2(j+1)}$$

Similarly, the output $P^{(j)}$ of the m identity cells in the $j^{th}$ column of the calculating processor is:

$$P^{(j)} = \sum_{i=0}^{m-1} p_i^{(j)} \cdot \alpha^i \quad 0 \le j \le m-1$$

Then $$P^{(j)} = \sum_{i=0}^{m-1} (p_i^{(j-1)} + q_i^{(j-1)} \cdot b_j) \cdot \alpha^i$$

$$= \left[\sum_{i=0}^{m-1} p_i^{(j-1)} \cdot \alpha^i\right] + \left[\sum_{i=0}^{m-1} q_i^{(j-1)} \cdot \alpha^i\right] \cdot b_j$$

$$= P^{(j-1)} + Q^{(j-1)} \cdot b_j$$

$$\vdots$$

$$= P^{(0)} + Q^{(0)} \cdot b_1 + \ldots + Q^{(j-2)} \cdot b_{j-1} + Q^{(j-1)} \cdot b_j$$

$$= A \cdot b_0 + (A \cdot \alpha^2) \cdot b_1 + \ldots + (A \cdot \alpha^{2(j-1)}) \cdot b_{j-1} + (A \cdot \alpha^{2j}) \cdot b_j$$

$$= A \cdot (b_0 + b_1 \alpha^2 + \ldots + b_{j+1} \alpha^{2(j+1)} + b_j \alpha^{2j})$$

$$= A \cdot \left(\sum_{k=0}^{j} b_k \cdot \alpha^{2k}\right)$$

According to this rule, the output of the calculating processor is:

$$P = \sum_{i=0}^{m-1} p_i \cdot \alpha^i$$

$$= \sum_{i=0}^{m-1} p_i^{(m-1)} \cdot \alpha^i$$

$$= P^{(m-1)}$$

$$= A \cdot \left(\sum_{k=0}^{m-1} b_k \cdot \alpha^{2k}\right)$$

$$= A \cdot \left(\sum_{k=0}^{m-1} b_k \cdot \alpha^k\right)^2$$

$$= A \cdot B^2$$

Thus, the calculating processor performs $AB^2$ when Control=1.

Example

Calculating Processor of a Finite Field $GF(2^4)$

Figure 3:
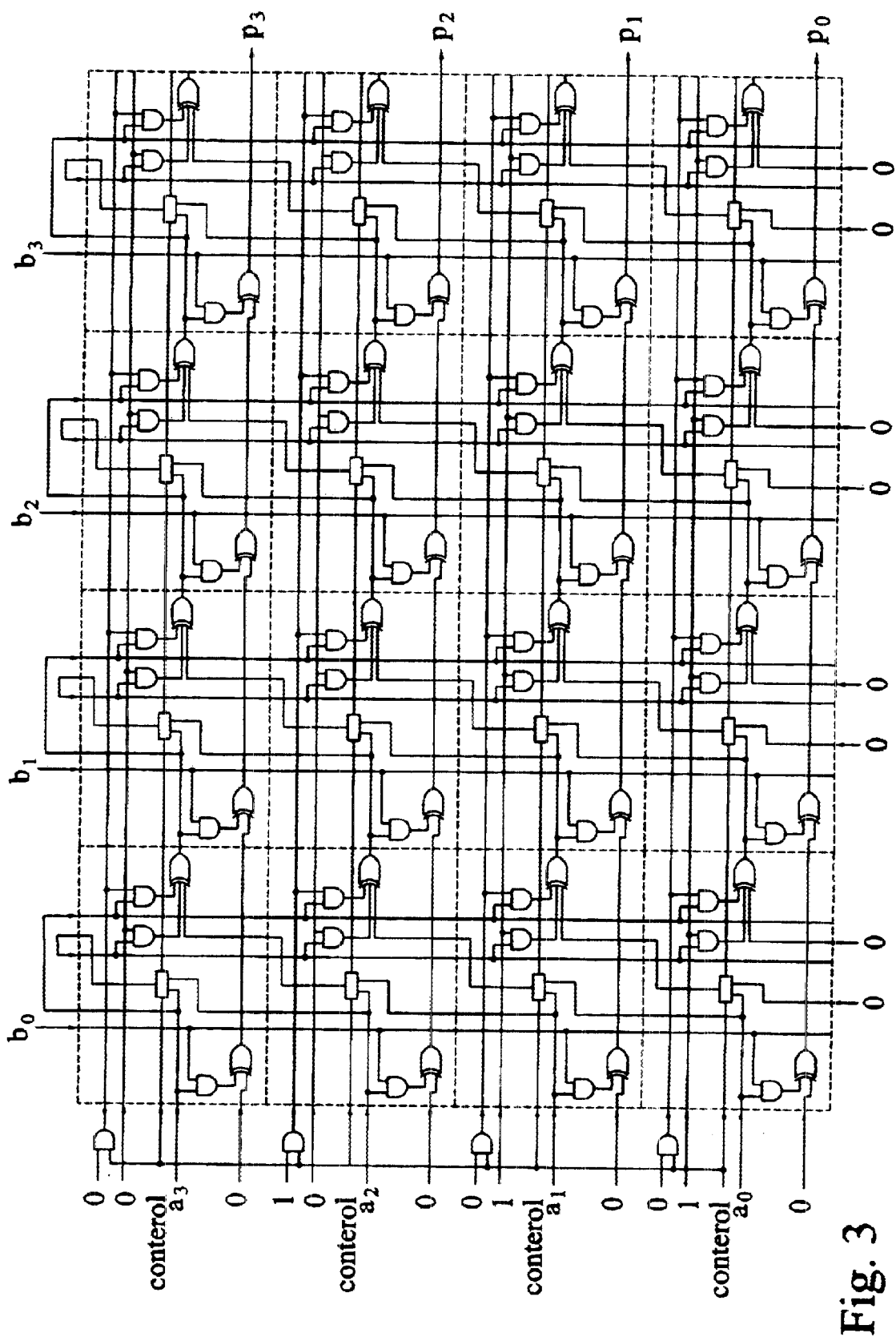
FIG. 3 is a circuit diagram showing a calculator of the present invention when m=4.

A calculating processor in the finite field $GF(2^4)$ is disclosed (see FIG. 3). This calculating processor is an array of 4×4 identity cells. The primitive polynomial $F(x)$ of the finite field $GF(2^4)$ is $F(x)=1+X+X^4$. That is, $f_0=f_1=1$, $f_2=f_3=0$ and $$\begin{cases} f'_0 = f'_3 = 0, & f'_1 = f'_2 = 1 \quad \text{control} = 1 \\ f'_i = 0, & 0 \le i \le 3 \quad \text{control} = 0 \end{cases}$$

The input signals are two elements $A=(a_0, a_1, a_2, a_3)$, $B=(b_0, b_1, b_2, b_3)$ and a control signal Control, and the output signal $p_0$–$p_3$ is $$P = [p_{m-1}, p_{m-2}, \ldots, p_1, p_0] = p_{m-1}\alpha^{m-1} + p_{m-2}\alpha^{m-2} + \cdots + p_1\alpha + p_0$$

$$= \begin{cases} A \cdot B & \text{control} = 0 \\ AB^2 & \text{control} = 1 \end{cases}$$

By this method, a calculating processor of any size can be designed.

General Calculating Processor

Figure 4A:
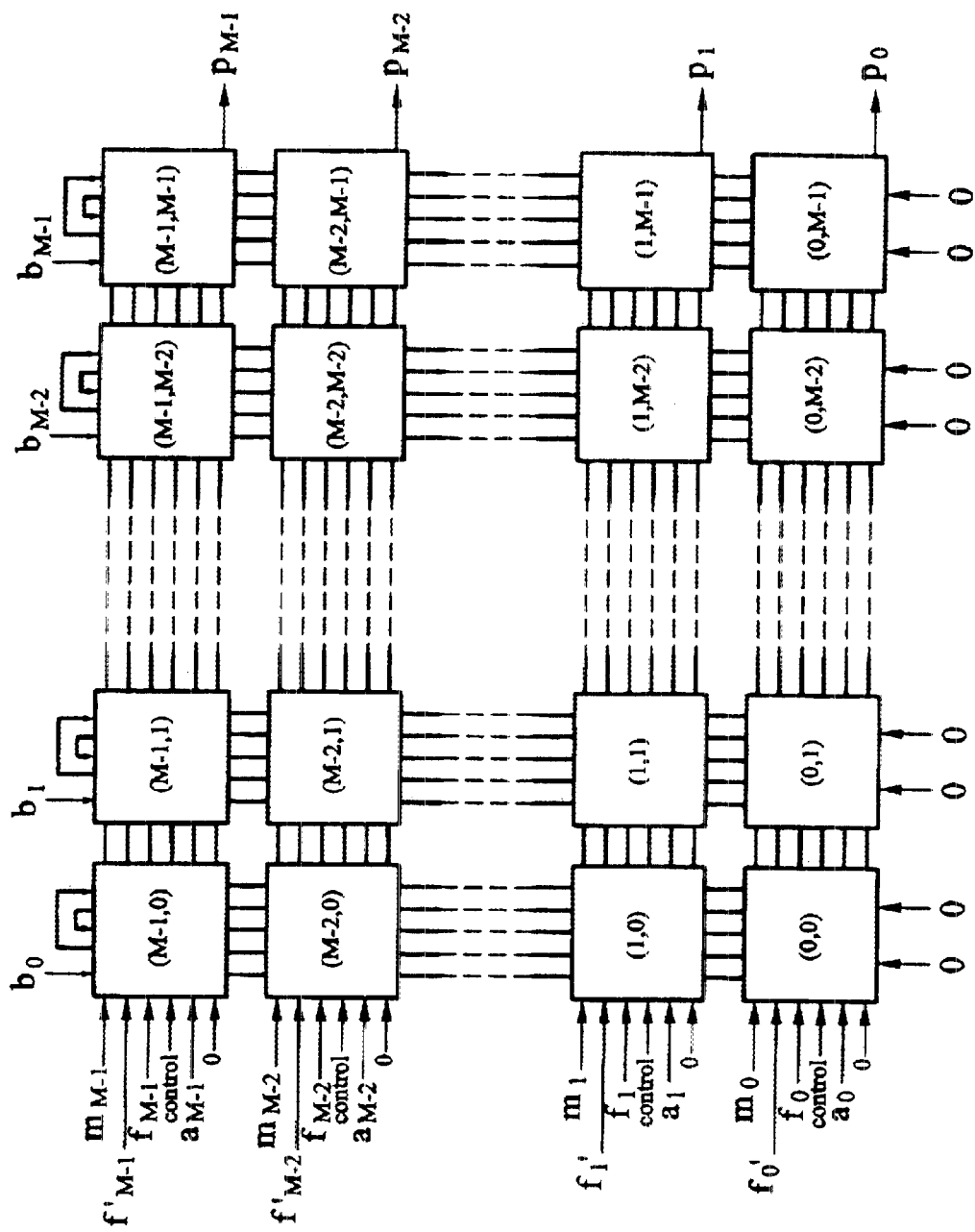
FIG. 4A is a structure diagram showing a general calculating processor in the arithmetic circuit of the present invention.
Figure 4B:
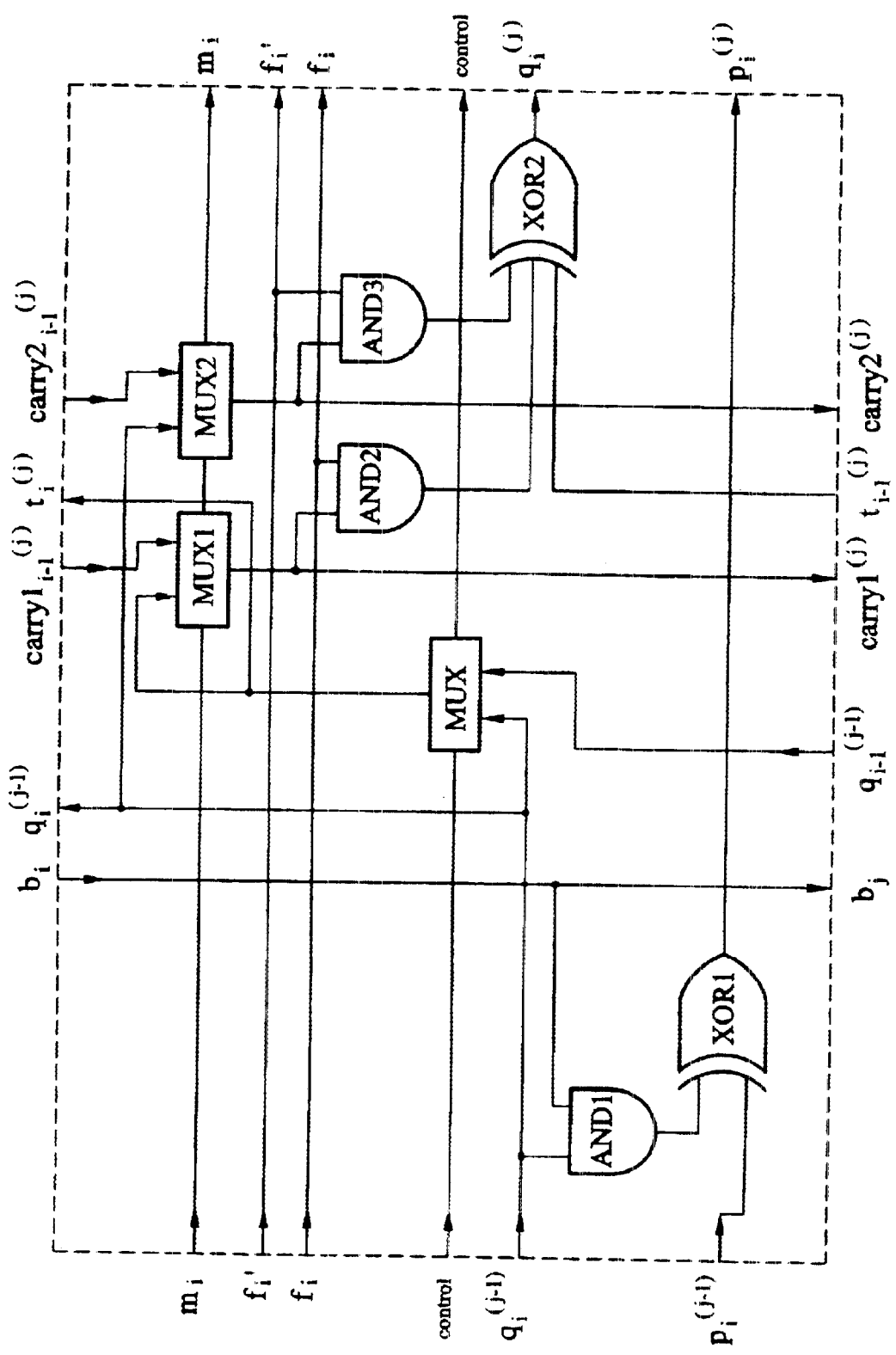
FIG. 4B is a circuit diagram showing the [i,j] identity cell in the general calculating processor in FIG. 4A.

The calculating processor mentioned above can be modified to a general calculating processor of a finite field $GF(2^m)$ (see FIG. 4). The same with the above calculating processor, the general calculating processor is also an array of identity cells. Assume this general calculating processor is structured of M×M identity cells, then this general calculating processor can perform the $A*B$ and $A*B^2$ operation in all finite field $GF(2^m)$ if m<=M, where A and B are elements of the finite field $GF(2^m)$. Further, to adapt different-sized finite field $GF(2^m)$, each identity cell is further provided with two two-input multiplexers MUX1, MUX2 and a control signal $m_i$. The control signal $m_i$ is determined by the size m of the finite field $GF(2^m)$, for controlling the multiplexers MUX1 and MUX2. The control signal $m_{m-1}=1$ only for the $(m-1)^{th}$ row of identity cells, so that the multiplexer MUX1 can pass $t_{m-1}^{(j)}$ to $Carry1_i^{(j)}$ ($i \leq m-1$) in the same row, and the other multiplexer MUX2 can pass $q_{m-1}^{(j-1)}$ to $Carry2_i^{(j)}$ ($i \leq m-1$) in the same row. The other control signals $m_i=0$ for $i \neq m-1$, so that the multiplexer MUX1 in all identity cells for $i<m-1$ can receive $Carry1_{i+1}^{(j)}=t_{m-1}^{(j-1)}$ of the upper identity cell to its $Carry1_i^{(j)}$, and the other multiplexer MUX2 in all identity cells for $i<m-1$ can receive $Carry2_{i+1}^{(j)}=q_{m-1}^{(j-1)}$ of the upper identity cell to its $Carry2_i^{(j)}$. Thus, the m×m identity cells at the right-down part of this general calculating processor perform the same arithmetic operations as the above mentioned m×m calculating processor. Further, the input signal $b_j=0$ for $m<=j<=M-1$, $$p_i^{(m)} = p_i^{(m-1)} + q_i^{(m-1)} \cdot b_m = p_i^{(m-1)} + q_i^{(m-1)} \cdot 0 = p_i^{(m-1)}$$

$$p_i^{(m+1)} = p_i^{(m)} + q_i^{(m)} \cdot b_{m+1} = p_i^{(m)} = p_i^{(m-1)}$$

$$\vdots$$

$$p_i^{(M-1)} = p_i^{(M-2)} + q_i^{(M-2)} \cdot b_M = p_i^{(M-2)} = \ldots = p_i^{(m-1)}$$

Therefore the output of the general calculating processor is:

$$P = \sum_{i=0}^{m-1} p_i \cdot \alpha^i$$

$$= \sum_{i=0}^{m-1} p_i^{(M-1)} \cdot \alpha^i$$

$$= \sum_{i=0}^{m-1} p_i^{(m-1)} \cdot \alpha^i$$

$$= P^{(m-1)}$$

$$= \begin{cases} A \cdot B & \text{control} = 0 \\ AB^2 & \text{control} = 1 \end{cases}$$

Thus, a general calculating processor which can perform AB and $AB^2$ in different-sized finite field $GF(2^m)$ can be designed.

The I/O ports of a general calculating processor includes two sets of input signals:

two input elements A and B:

$$A=[a_{m-1}, a_{m-2}, \ldots, a_1, a_0]=a_{m-1}\alpha^{m-1}+a_{m-2}\alpha^{m-2}+ \ldots +a_1\alpha+a_0$$
($m \leq M$), $$B=[b_{m-1}, b_{m-2}, \ldots, b_1, b_0]=b_{m-1}\alpha^{m-1}+b_{m-2}\alpha^{m-2}+ \ldots +b_1\alpha+b_0$$
($m \leq M$), a control signal Control, three control parameters: $f_i$, $f'_i$ and $m_i$ ($0 \leq i \leq M-1$), and an output signal:

$$P = [p_{m-1}, p_{m-2}, \ldots, p_1, p_0] = p_{m-1}\alpha^{m-1} + p_{m-2}\alpha^{m-2} + \cdots +$$

$$p_1\alpha + p_0 \quad (m \leq M)$$

$$= \begin{cases} A \cdot B & \text{control} = 0 \\ AB^2 & \text{control} = 1 \end{cases}$$

To reduce the number of the I/O ports, the primitive polynomial generator and the field-size controller can be designed with simple logic gates. By inputting several bits of control signals, parameters $f_i$ and $f'_i$ can be obtained by the primitive polynomial generator and parameter $m_i$ can be obtained by the field-size controller. Thus, the total number of the I/O ports can be reduced.

Example

General Calculating Processor for Finite Fields GF$(2^3)$~GF$(2^{10})$

Figure 5:
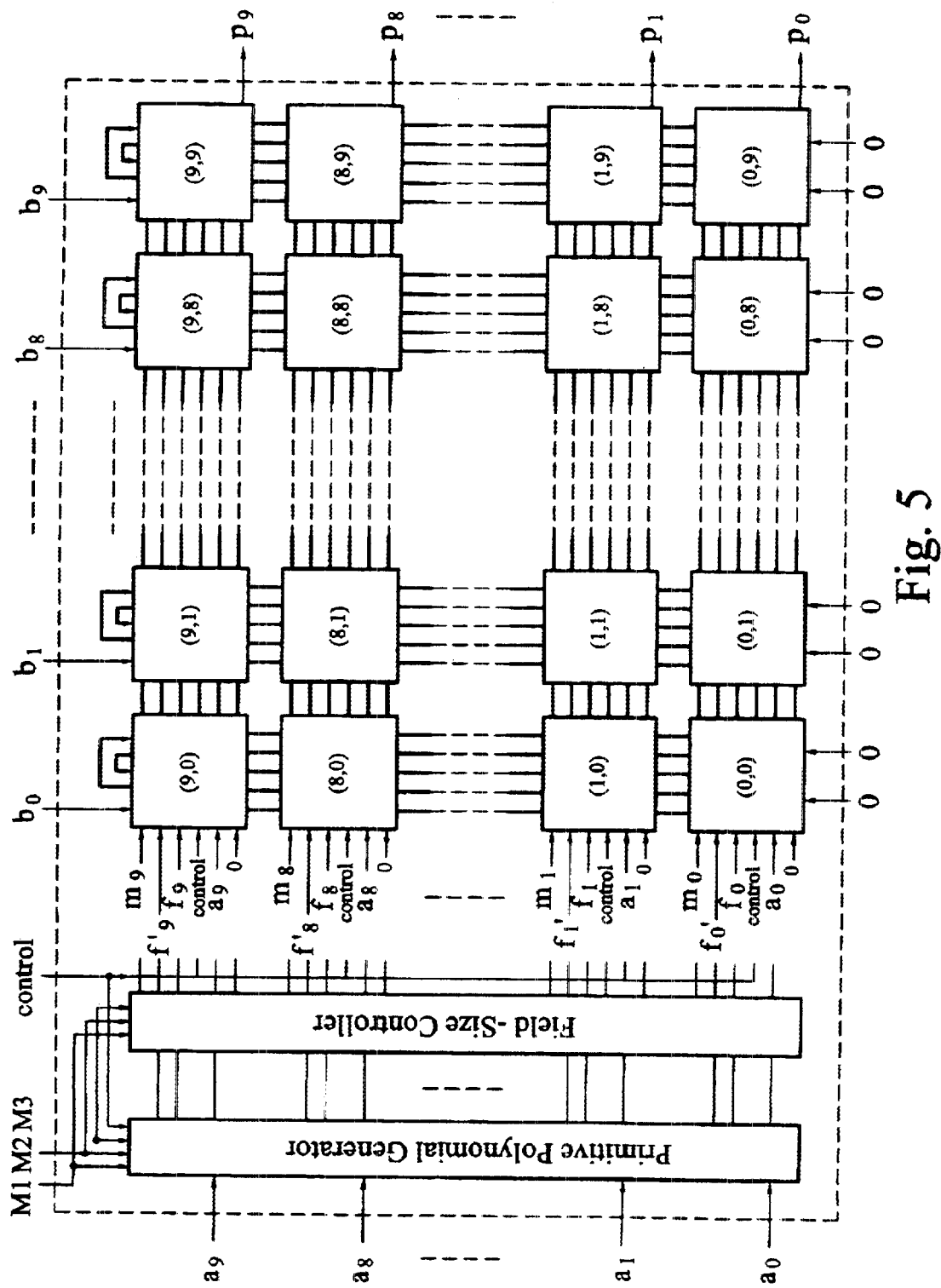
FIG. 5 is a circuit diagram showing a general calculating processor in the arithmetic circuit of the present invention when m=3~10.
Figure 6:
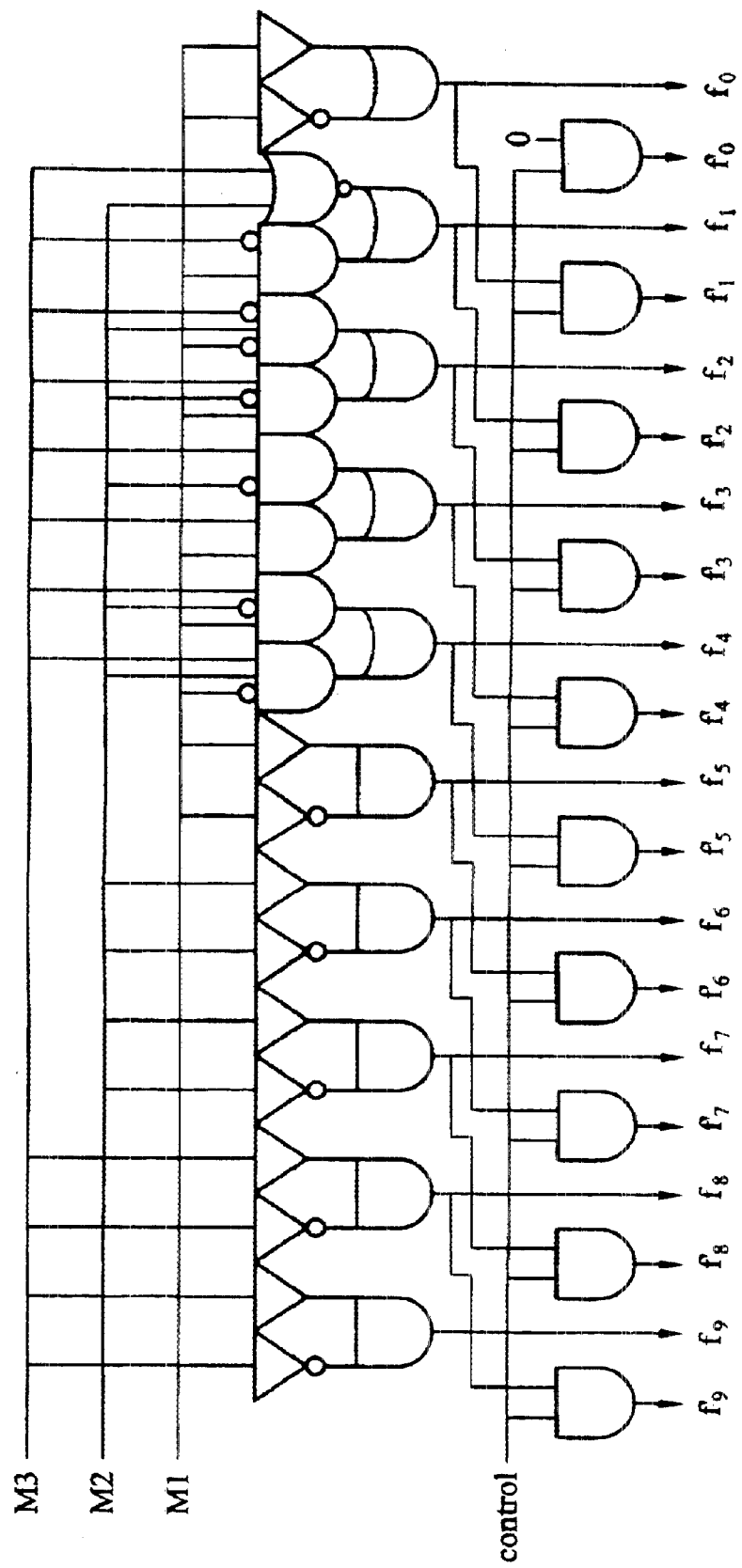
FIG. 6 is a circuit diagram showing a primitive-polynomial generator in the arithmetic circuit of the present invention.
Figure 7:
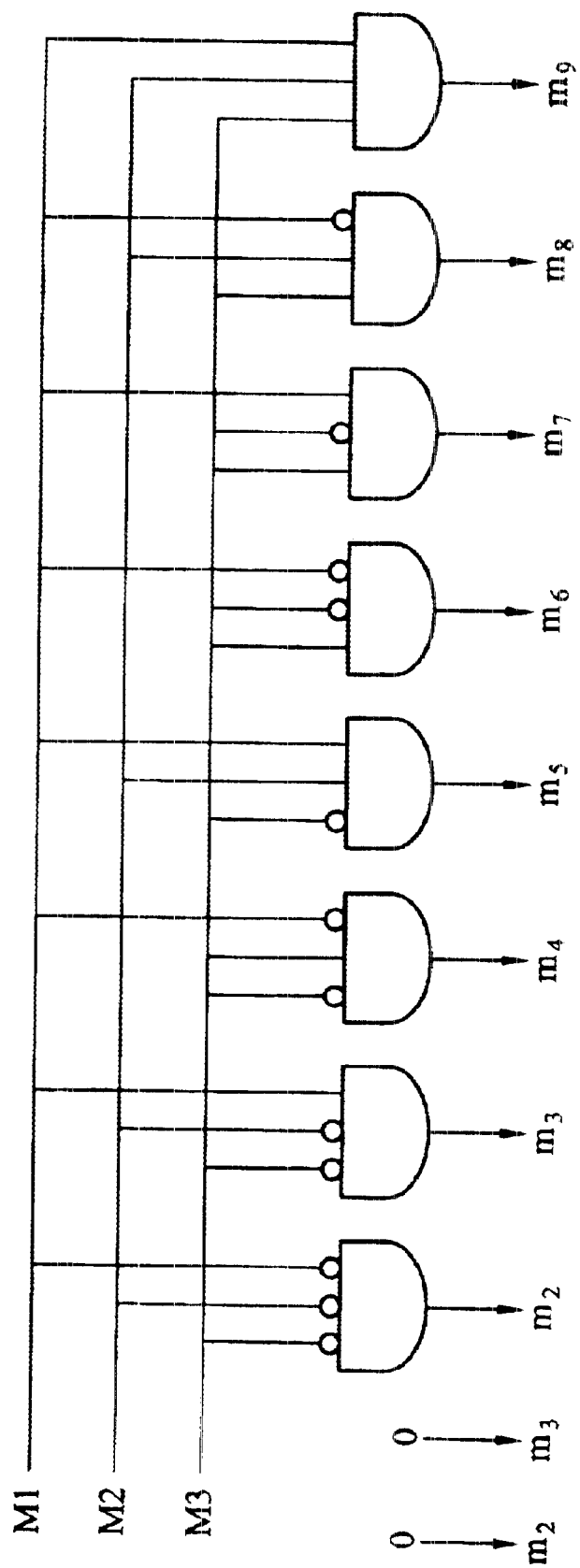
FIG. 7 is a circuit diagram showing a size controller in the arithmetic circuit of the present invention.

As shown in FIG. 5, a general calculating processor for finite fields GF$(2^3)$~GF$(2^{10})$ includes an array of 10×10 identity cells, a primitive polynomial generator and a field-size controller. The primitive polynomial generator and the field-size controller are controlled by three control signals M1~M3. Assume the primitive polynomial for the finite field GF$(2^m)$ is expressed as $f(x)=x^m+f_{m-1}x^{m-1}+ \ldots +f_2x^2+ f_1x+f_0$, $m = 3 \quad f(x) = 1 + x + x^3$ $m = 4 \quad f(x) = 1 + x + x^4$ $m = 5 \quad f(x) = 1 + x^2 + x^5$ $m = 6 \quad f(x) = 1 + x + x^6$ $m = 7 \quad f(x) = 1 + x^3 + x^7$ $m = 8 \quad f(x) = 1 + x^2 + x^3 + x^4 + x^8$ $m = 9 \quad f(x) = 1 + x^4 + x^9$ $m = 10 \quad f(x) = 1 + x^3 + x^{10}$ $\vdots$ This patent has confirmed that $f_{m-1}=0$ for m=3~34, therefore $f_i=f_{i-1}, 1 \leq i \leq m-1$. Thus, the primitive polynomial generator can be simplified to reduce the circuit complexity, whose truth table is listed in Table I, as shown in FIG. 6. Also, the field-size controller of the finite field GF$(2^m)$ can be designed according to the truth table listed in Table II, as shown in FIG. 7.

Thus, a general calculating processor for a finite field GF$(2^m)$, m=3~10 can be implemented. The calculating processor includes an array of 10×10 identity cells, a primitive polynomial generator and a field-size controller. The input signals includes $a_0$-$a_9$, $b_0$-$b_9$, M1, M2, M3 and control; while the output signal is $p_0$-$p_9$.

TABLE I

| M3 | M2 | M1 | $f_0$ | $f_1$ | $f_2$ | $f_3$ | $f_4$ | $f_5$ | $f_6$ | $f_7$ | $f_8$ | $f_9$ |
|---|---|---|---|---|---|---|---|---|---|---|---|---|
| 3 | 0 | 0 | 0 | 1 | 1 | 0 | 0 | 0 | 0 | 0 | 0 | 0 |
| 4 | 0 | 0 | 1 | 1 | 1 | 0 | 0 | 0 | 0 | 0 | 0 | 0 |
| 5 | 0 | 1 | 0 | 1 | 0 | 1 | 0 | 0 | 0 | 0 | 0 | 0 |
| 6 | 0 | 1 | 1 | 1 | 1 | 0 | 0 | 0 | 0 | 0 | 0 | 0 |
| 7 | 1 | 0 | 0 | 1 | 0 | 0 | 1 | 0 | 0 | 0 | 0 | 0 |
| 8 | 1 | 0 | 1 | 1 | 0 | 1 | 1 | 1 | 0 | 0 | 0 | 0 |
| 9 | 1 | 1 | 0 | 1 | 0 | 0 | 0 | 1 | 0 | 0 | 0 | 0 |
| 10 | 1 | 1 | 1 | 1 | 0 | 0 | 1 | 0 | 0 | 0 | 0 | 0 |

TABLE II

| m | M3 | M2 | M1 | $m_0$ | $m_1$ | $m_2$ | $m_3$ | $m_4$ | $m_5$ | $m_6$ | $m_7$ | $m_8$ | $m_9$ |
|---|---|---|---|---|---|---|---|---|---|---|---|---|---|
| 3 | 0 | 0 | 0 | 0 | 0 | 1 | 0 | 0 | 0 | 0 | 0 | 0 | 0 |
| 4 | 0 | 0 | 1 | 0 | 0 | 0 | 1 | 0 | 0 | 0 | 0 | 0 | 0 |
| 5 | 0 | 1 | 0 | 0 | 0 | 0 | 0 | 1 | 0 | 0 | 0 | 0 | 0 |
| 6 | 0 | 1 | 1 | 0 | 0 | 0 | 0 | 0 | 1 | 0 | 0 | 0 | 0 |
| 7 | 1 | 0 | 0 | 0 | 0 | 0 | 0 | 0 | 0 | 1 | 0 | 0 | 0 |
| 8 | 1 | 0 | 1 | 0 | 0 | 0 | 0 | 0 | 0 | 0 | 1 | 0 | 0 |
| 9 | 1 | 1 | 0 | 0 | 0 | 0 | 0 | 0 | 0 | 0 | 0 | 1 | 0 |
| 10 | 1 | 1 | 1 | 0 | 0 | 0 | 0 | 0 | 0 | 0 | 0 | 0 | 1 |

Arithmetic Processor (AP)

Figure 8:
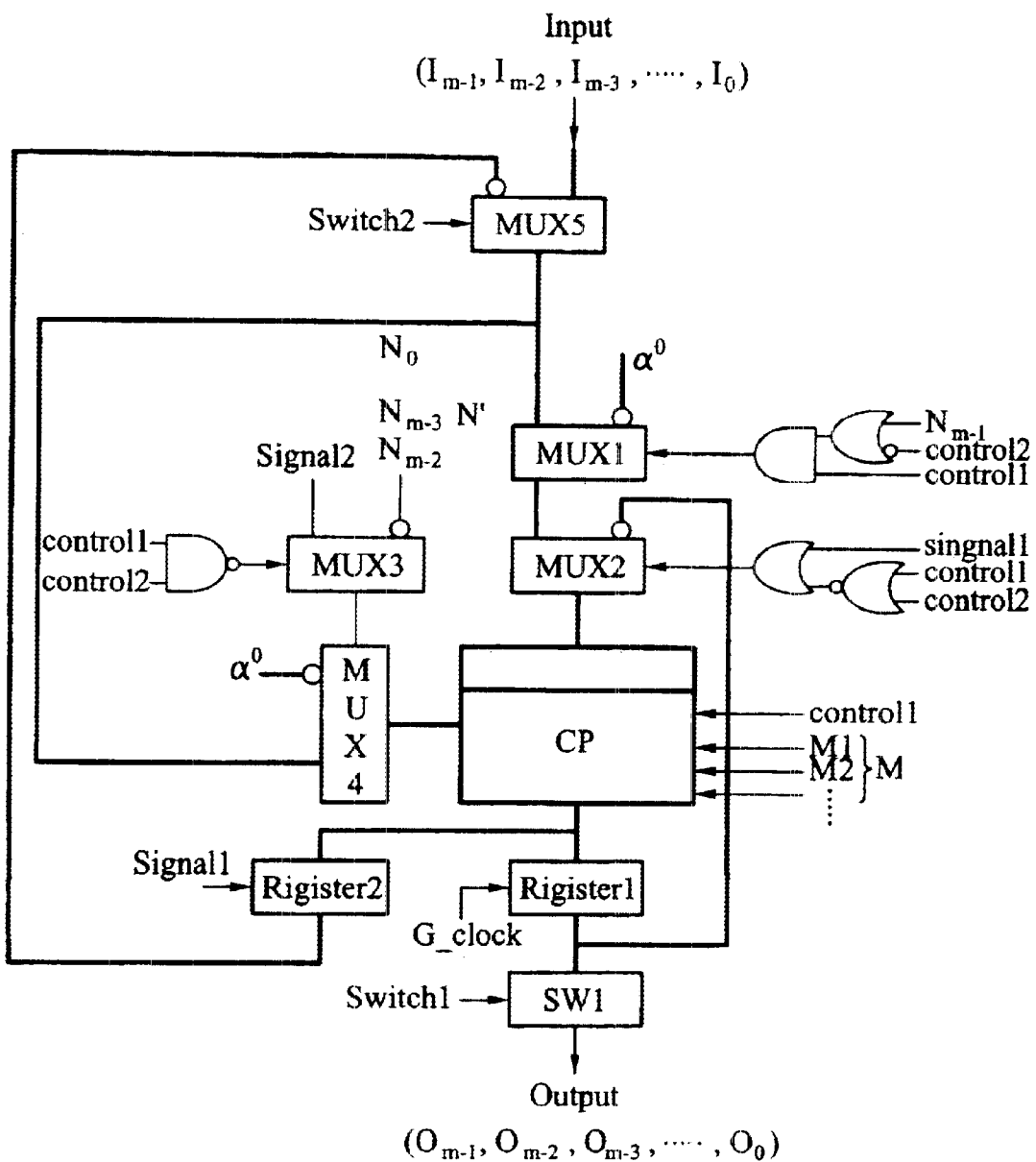
FIG. 8 is a structure diagram showing an arithmetic processor in the arithmetic circuit of the present invention.

S Arithmetic processor is structured on the calculating processor, for performing all arithmetic operations except addition. These arithmetic operations can be combined by four basic operations. That is: loading, multiplication, exponentiation and inverse multiplication. For example, division is implemented by combining multiplication and inverse multiplication. The detailed structure diagram of the arithmetic processor is shown in FIG. 8, which includes a calculating processor and additional control circuits and storage memories. For a finite field $GF(2^m)$, these control circuits and storage memories includes five m-bit multiplexers, two groups of m-bit D-type flip flops, an m-bit switch and some logic gates generating control signals for nultiplexers. The input of the arithmetic processor includes: Input=$(I_{m-1}, I_{m-2}, I_{m-3}, \ldots, I_0)$, control signal M=(M1, M2, ... ) determined by the size of the finite field $GF(2^m)$, Signal1, Signal2, Control1, Control2, $N_{m-1}$, N', Switch1, Switch2 and G_Clock, while the output of the arithmetic processor includes: Output=$(O_{m-1}, O_{m-2}, O_{m-3}, \ldots, O_0)$.

Hereafter, basic arithmetic operations (loading, multiplication, exponentiation and inverse multiplication) which are controlled by two control signals Control1, Control2, are respectively described.

<1>Loading

Figure 9:
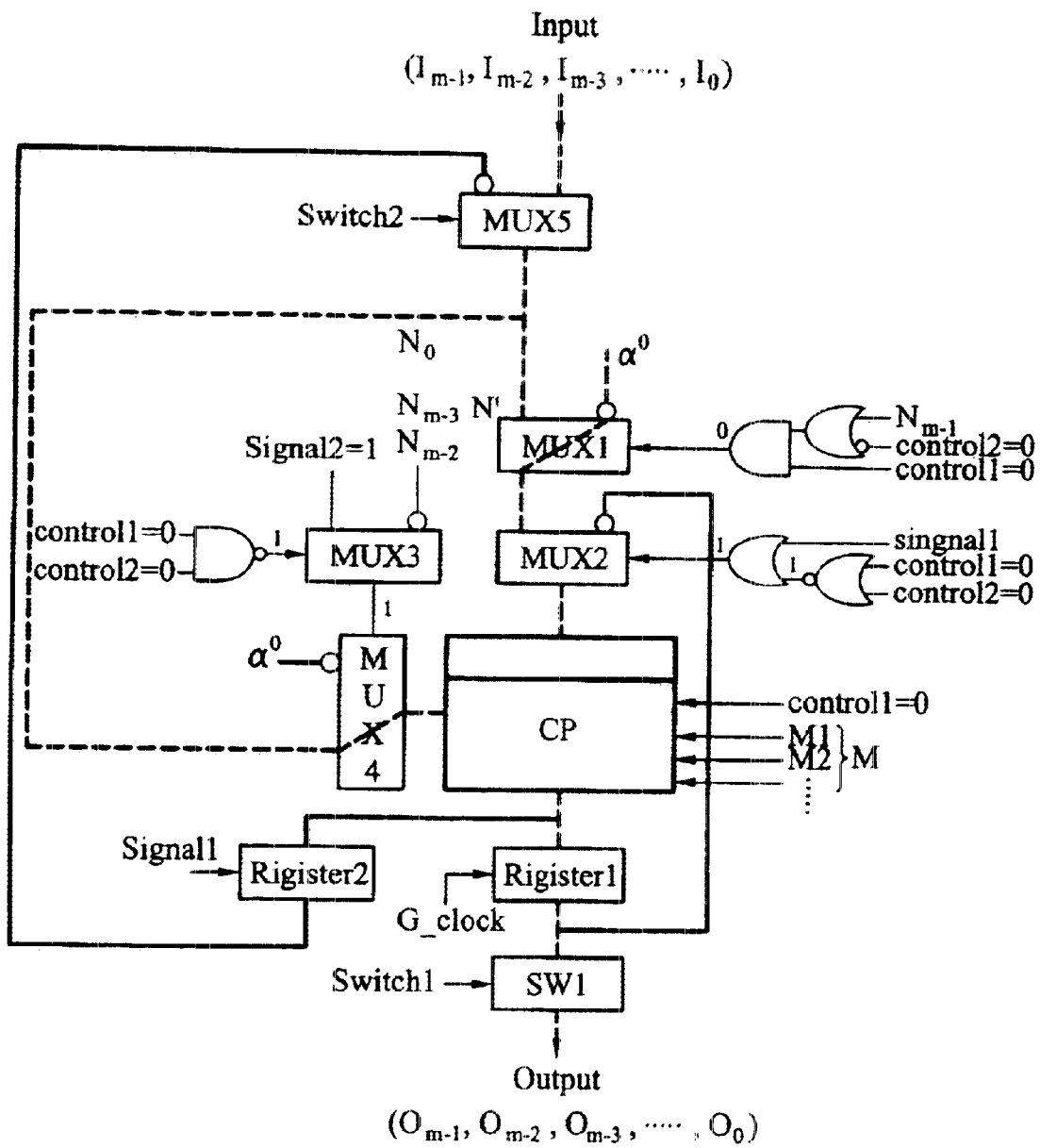
FIG. 9 is a flow diagram showing the arithmetic processor when performing loading.

When the control signals (Control1, Control2)=(0, 0), the arithmetic processor performs the loading operation. This is to have the input Input=$(I_{m-1}, I_{m-2}, I_{m-3}, \ldots, I_0)$ stored in the register Register1 of the arithmetic processor to serve as an initial value for the next instruction. At this time, the control signals for the multiplexers MUX1~MUX4 are respectively 0, 1, 1, 1. If the input Input=$(I_{m-1}, I_{m-2}, I_{m-3}, \ldots, I_0)$=$\beta$, then two input elements input to the calculating processor are respectively $\beta$ and $\alpha^0$. Because the control signal control is 0, the calculating processor performs the A*B operation and the outcome $\beta \cdot \alpha^0 = \beta$ is then loaded to the register Register1, as shown in FIG. 9.

<2>Multiplication

Figure 10:
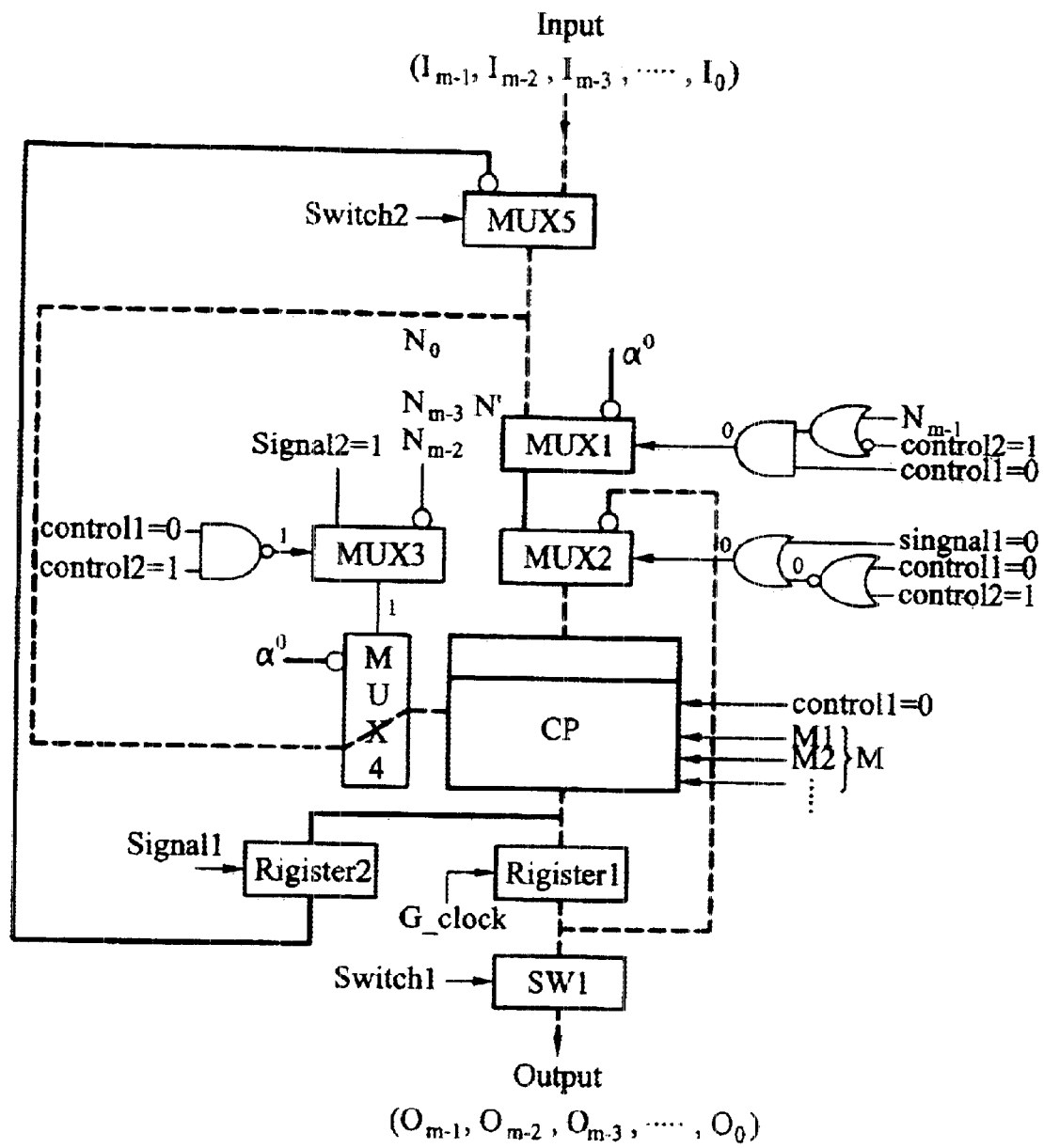
FIG. 10 is a flow diagram showing the arithmetic processor when performing multiplication.

When the control signals (Control1, Control2)=(0, 1), the arithmetic processor performs multiplication, multiplying the input Input=$(I_{m-1}, I_{m-2}, I_{m-3}, \ldots, I_0)$ or the data stored in the register Register2 (determined by the multiplexer MUX5 controlled by the switch signal Switch2) by the data stored in the register Register1. When Switch2=1, the arithmetic processor multiplies the input Input=$(I_{m-1}, I_{m-2}, I_{m-3}, \ldots, I_0)$ by the data stored in the register Register1. When Switch2=0, the arithmetic processor multiplies the data stored in the register Register2 by the data stored in the register Register1. When executing this instruction, the calculating processor performs the A*B operation because Control1=0, and the control signals of the multiplexers MUX2~MUX4 are respectively 0, 1, 1. The outcome is then stored back in the register Register1, as shown in FIG. 10.

<3>Exponentiation

When the control signals (Control1, Control2)=(1, 1), the arithmetic processor performs exponentiation, especially $\beta^N$, where $\beta \in GF(2^m)$ ($0 \leq N \leq 2^m-2$). $\beta$ is an element in the finite field $GF(2^m)$, which is input from the input Input=$(I_{m-1}, I_{m-2}, I_{m-3}, \ldots, I_0)$ where N is between 0 and $2^m-2$ and can be divided as $N=N_0+N_1 2+N_2 2^2+ \ldots +N_{m-1} 2^{m-1}$, then $\beta^N$ can be expressed as:

$$\beta^N = \beta^{(N_0+N_1 2+N_2 2^2+\ldots+N_{m-1} 2^{m-1})}$$

$$= \beta^{N_0} \left[\beta^{N_1}\left[\ldots \beta^{N_{m-2}}(\beta^{N_{m-1}})^2\right]^2\right]^2$$

The deriving procedure is:

$P_1 = \beta^{N_{m-2}}(\beta^{N_{m-1}})^2$ $P_2 = \beta^{N_{m-3}} \cdot P_1^2 = \beta^{N_{m-3}}[\beta^{N_{m-2}} \cdot (\beta^{N_{m-1}})^2]$ $P_i = \beta^{N_{m-i-1}} \cdot P_{i-1}^2$ $P_{m-1} = \beta^{N_0} \cdot P_{m-2}^2 = \beta^{N_0}\left[\beta^{N_1}\left[\ldots \beta^{N_{m-3}}\left(\beta^{N_{m-2}}(\beta^{N_{m-1}})^2\right)^2\right]^2\right]^2$ Apparently, exponentiation $\beta^N$ can be implemented by m−1 $AB^2$ operations of the calculating processor. Therefore the control signal Control1=1 for (m−1) cycles so that the calculating processor performs the $A*B^2$ operations for (m−1) times. The outcome $P_i$ of the $i^{th}$ cycle is stored in the register Register1 so as to feedback to the calculating processor for the next operation.

$$\beta^{N_i} = \begin{cases} \beta & N_i = 1 \\ \alpha^0 & N_i = 0 \end{cases}$$

Figure 11:
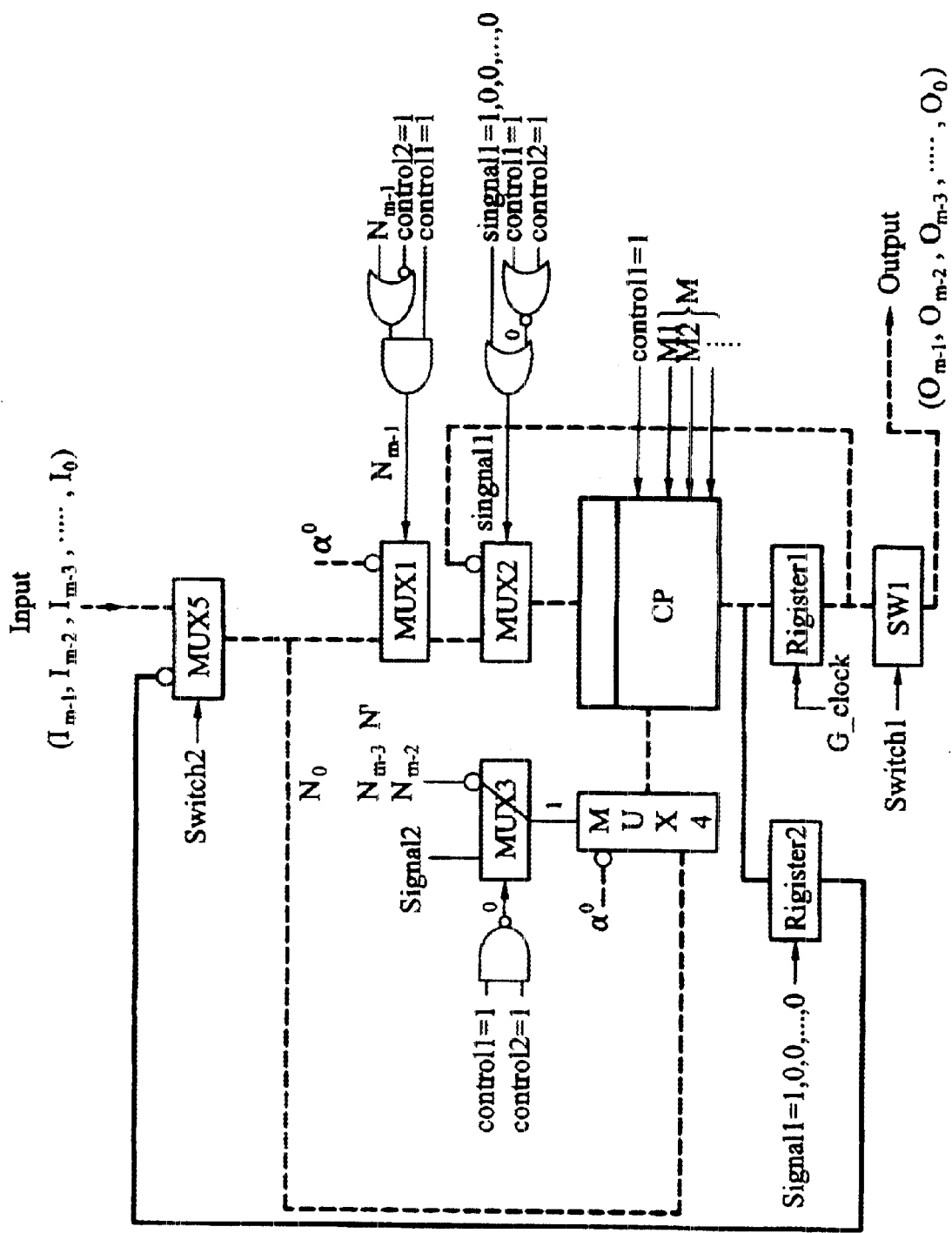
FIG. 11 is a flow diagram showing the arithmetic processor when performing exponentiation.

Further, the outcome of the exponentiation $\beta^{N_i}$ is selected from $\alpha_0$ or $\beta$ according to $N_i$. The control signal of the multiplexer MUX5 is Switch2=1 for (m−1) cycles, the control signal of the multiplexer MUX1 is $N_{m-1}$ for the first cycle, the control signal of the multiplexer MUX2 is Signal1=(1, 0, 0, ..., 0) for (m−1) cycles, the control signal of the multiplexer MUX3 is 0 for (m−1) cycles, the control signal of the multiplexer MUX4 is N'=$(N_{m-2}, N_{m-3}, \ldots, N_0)$. Thus, the outcome of the exponentiation operation can be obtained in (m−1) cycles and stored in the register Register1. Further, when the exponentiation operation is executing, the outcome $P_i$ for each cycle is stored in the register Register1, therefore the data of the previous instruction stored in the register Register1 has to be transferred to the register Register2 (controlled by the signal Signal1) for later use. The procedure of the arithmetic processor can be seen in FIG. 11.

<4>Inverse Multiplication

Figure 12:
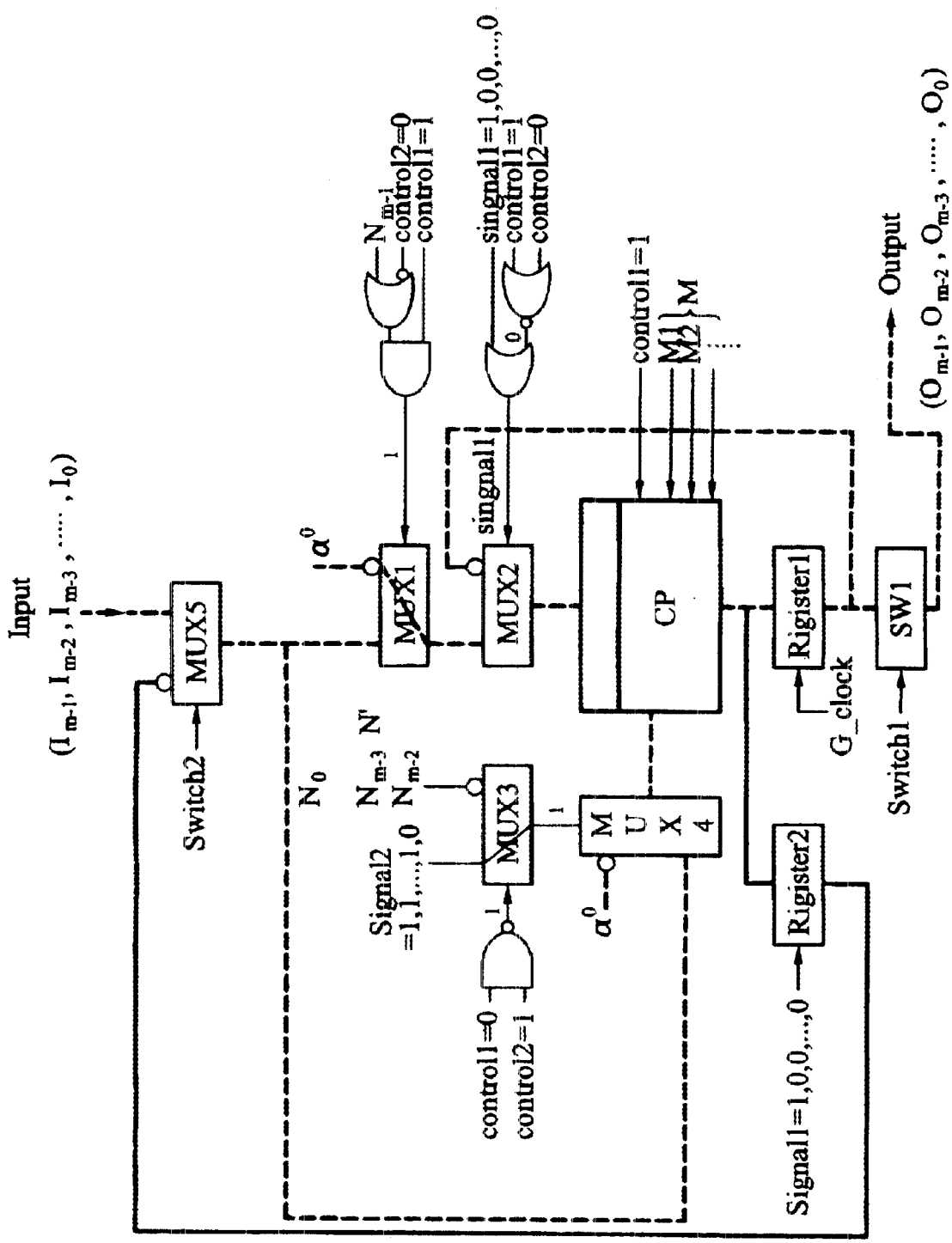
FIG. 12 is a flow diagram showing the arithmetic processor when performing inverse multiplication.

When the control signal (Control1, Control2)=(1, 0), the arithmetic processor performs inverse multiplication $\beta^{-1}$, where $\beta \in GF(2^m)$. In fact, for the finite field $GF(2^m)$, $\beta^{-1} = \beta^{-2}$. Therefore, to perform $\beta^{-1}$ is to perform exponentiation of $N=0+1 \cdot 2+1 \cdot 2^2+ \ldots +1 \cdot 2^{m-1}$, where $N_0=0, N_1=N_2= \ldots =N_{m-1}=1$). The detailed procedure is:

$P_1 = \beta \cdot \beta^2 = \beta\beta^2$ $P_2 = \beta \cdot P_1^2 = \beta\beta^2\beta^4$ $\vdots$ $P_i = \beta \cdot P_{i-1}^2 = \beta \cdot \beta^2 \ldots \beta^{2^i}$ $\vdots$ $P_{m-1} = \alpha^0 \cdot P_{m-2}^2 = \alpha^0 \cdot \beta^2 \cdot \beta^{2^2} \ldots \beta^{2^{m-1}}$ $= \beta^{2^m-2} = \beta^{-1}$ Apparently, inverse multiplication $\beta^{-1}$, exponentiation $\beta^N$, is implemented by (m−1) $AB^2$ operations of the calculating processor. Therefore the control signal Control1=1 for (m−1) cycles so that the calculating processor performs $AB^2$ operation for (m−1) times. The outcome $P_i$ of the $i^{th}$ cycle is stored in the register Register1 so as to feedback to the calculating processor for the next $AB^2$ operation. The control signal of the multiplexer MUX5 is Switch2=1 for (m−1) cycles, the control signal of the multiplexer MUX1 is $N_{m-1}$ for the first cycle, the control signal of the multiplexer MUX2 is Signal1=(1, 0, 0, . . . , 0) for (m−1) cycles, the control signal of the multiplexer MUX3 is 1 for (m−1) cycles, the control signal of the multiplexer MUX4 is Signal2=(1, 1, 1, . . . , 0). Thus, the outcome of the inverse multiplication operation can be obtained in (m−1) cycles and stored in the register Register1. Further, when the inverse multiplication operation is executing, the outcome $P_i$ for each cycle is stored in the register Register1, therefore the data of the previous instruction stored in the register Register1 has to be transferred to the register Register2 (controlled by the signal Signal1) for later use. The procedure of the arithmetic processor can be seen in FIG. 12.

As it is able to perform loading, multiplication, exponentiation and inverse multiplication, the arithmetic processor can perform all arithmetic operations in the finite field $GF(2^m)$ except addition (accumulation), which can be implemented by the arithmetic logic unit.

Arithmetic Logic Unit (ALU)

Figure 13:
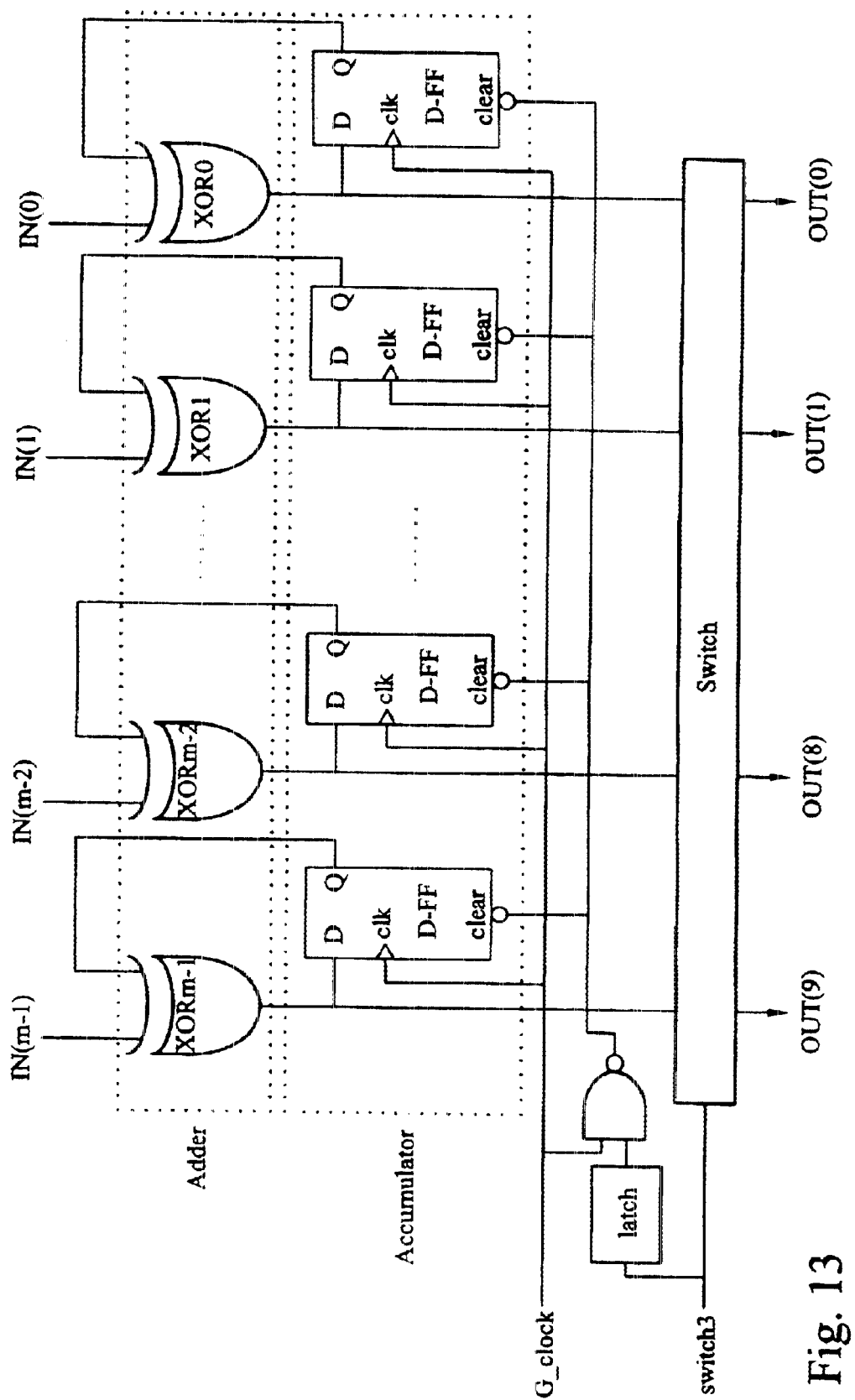
FIG. 13 is a circuit diagram showing an arithmetic logic unit in the arithmetic circuit of the present invention.

Addition in the finite field $GF(2^m)$ can be simply implemented by m XOR gates, and another register is provided to store the previous data when performing accumulation. When the accumulation is completed, the register is also refreshed. The whole arithmetic logic unit can be seen in FIG. 13. This circuit is designed to perform one accumulation in each cycle, which adds the data from the arithmetic processor and the data stored in the register and outputs back to the register. Whether or not the arithmetic processor performs accumulation is determined by the control signal Switch1. When Switch1=1, the arithmetic logic unit receives the output of the arithmetic processor and performs accumulation. When Switch1=0, a zero element (0) in the finite field $GF(2^m)$ is sent to the arithmetic logic unit, then the output of the arithmetic logic unit remains the same.

Arithmetic Unit (AU)

Combining the arithmetic processor, the arithmetic logic unit and the control circuit, the overall arithmetic circuit for the finite field $GF(2^m)$ can be obtained. The input of the arithmetic circuit includes: Input=$(I_{m-1}, I_{m-2}, I_{m-3}, \ldots, I_0)$, control signal M=(M1, M2, . . . ) which is determined by the size of the finite field $GF(2^m)$, Signal1, Signal2, Control1, Control2, $N_{m-1}$, N', Switch1, Switch2, Switch3, Clear and G_Clock. The output of the arithmetic circuit includes: Output=$(O_{m-1}, O_{m-2}, O_{m-3}, \ldots, O_0)$. The description for these I/O signals is:

| Control1, Control2 | Description |
| --- | --- |
| 0, 0 | Loading |
| 0, 1 | Multiplication |
| 1, 1 | Exponentiation |
| 1, 0 | Inverse |
| Signal1 | Exponentiation/inverse multiplication: Signal1 = (100 . . . 0) in (m − 1) cycles Loading/multiplication: Signal1 = 0 |
| Signal2 | Exponentiation/inverse multiplication: Signal2 = (111 . . . 10) in (m − 1) cycles Loading/multiplication: Signal2 = 1 |
| $N_{m-1}$, N' | Exponentiation $\beta^N$, where $N = N_0 + N_1 2 + N_2 2^2 + \ldots + N_{m-1} 2^{m-1}$, and $Nm - 1 = N_{m-1}$ (N' = $N_{m-2}, N_{m-3}, \ldots, N_0$) |
| Clear | Clear data stored in the registers |
| G_Clock | Cycle signal of the arithmetic circuit |
| Switch1 | Addition: Switch = 1, else Switch1 = 0 |
| Switch2 | Data input externally $(I_{m-1}, I_{m-2}, \ldots, I_0)$: Switch2 = 1; data input from internal register Register2: Switch2 = 0 |
| Switch3 | Data output: Switch3 = 1, else Switch3 = 0 |
| $(I_{m-1}, I_{m-2}, \ldots, I_0)$ | Input signal |
| $(O_{m-1}, O_{m-2}, \ldots, O_0)$ | Output signal |
| M = (M1, M2, . . .) | Control signals for primitive polynomial generator and field-size controller |

Priority of the Arithmetic Circuit
1. Operations in the Bracket: ( ), [ ] and { }
   Arithmetic operations in the bracket have the highest priority.
2. Exponentiation and Inverse Multiplication
   Exponentiation and inverse multiplication have higher priority than multiplication and addition. When performing exponentiation and inverse multiplication, the former result is first stored in the register Register2. For example, when performing A/B which is implemented by combining multiplication and inverse multiplication, the element A is first loaded to the register Register2, then the element B is loaded to the register Register1 and used to obtain $B^{-1}$. After $B^{-1}$ is obtained in (m−1) cycles, the element A stored in the register Register1 and the element B stored in the element B are multiplied to obtain the final result.
3. Multiplication
   When the data used to perform multiplication includes an exponential number or inverse multiplicative number, the multiplication number is postponed until exponentiation or inverse multiplication is completed. From above, one can understand that multiplication has higher priority than addition. For example, when performing A+BC, the element A is first loaded, then the signal Switch1 is set to 1 so that the element A is sent to the arithmetic logic unit, followed with multiplication BC. In this case, the multiplication BC is first performed and the result is then sent to the arithmetic logic unit for later addition.
4. Addition
   Addition has the lowest priority in all arithmetic operations and is the only operation performed outside the arithmetic processor. When performing addition, the result of the arithmetic processor is sent to the arithmetic logic unit to perform accumulation. One can easily see this because the accumulation performed by the arithmetic logic unit is not started until all operations performed by the arithmetic processor are completed.

Summing up, the present invention provides an arithmetic circuit, which can perform all basic arithmetic operations in a finite field $GF(2^m)$, including addition, multiplication, division, exponentiation and inverse multiplication. The arithmetic circuit of the present invention is structured with a low circuit complexity, so that an error-correction decoder applying this arithmetic circuit can be greatly simplified.

While the invention has been particularly shown and described with the reference to the preferred embodiments thereof, it will be understood by those skilled in the art that various changes in form and details may be made without departing from the spirit and scope of the invention.

What is claimed is:

1. An arithmetic processor capable of executing arithmetic operations of multiplication A*B, exponential $B^N$ and inverse multiplication operation $B^{-1}$, where N is a positive integer, for loading elements A and B in a finite field $GF(2^m)$ and performing all arithmetic operations but an addition operation A+B in the finite field $GF(2^m)$, comprising:

a calculating processor capable of performing arithmetic operations AB and $AB^2$, for loading elements A and B in the finite field $GF(2^m)$ and outputting AB or $AB^2$ according to a control signal;

registers storing the outcome of the calculating processor; and control circuits selectively transmitting the elements A and B in the finite field $GF(2^m)$ from the input terminal of the arithmetic processor or the registers to the input terminals of the calculation processor according to the control signal so that the calculating processor can correctly output AB, $AB^2$;

wherein, a first and a second control signals are applied to the arithmetic processor: when the first and second control signals are logic low, the arithmetic processor performs a loading operation and an input $D=[d_{m-1}, d_{m-2}, \ldots, d_0]$ is stored in a first register from the registers, when the first control signal is 0 and the second control signal is 1, the arithmetic processor performs multiplication, multiplying the input $D=[d_{m-1}, d_{m-2}, \ldots, d_0]$ or a data C stored in a second register from the registers by the data stored in the first register and loading the outcome to the first register, when the first and second control signals are logic high, the arithmetic processor performs exponentiation by replacing exponential operation with the (m−1) times $C*D^2$, where m is a positive integer, represents the degree of $GF(2^m)$, when the first control signal is 1 and the second control signal is 0, the arithmetic processor performs inverse multiplication $D^{-1}$, where $D \in GF(2^m)$ and $D^{-1}=D^{2^m-2}$.

2. The arithmetic processor as claimed in claim 1, further comprising a switch for outputting the outcome of the calculating processor in the register according to a control signal.

3. The arithmetic processor as claimed in claim 1, wherein the control signal comprises a set of timing control signals for controlling timing sequence and data transmission of the control circuits and the registers.

4. The arithmetic processor as claimed in claim 1, wherein the finite field $GF(2^m)$ corresponds to a primitive polynomial F represented by $[f_{m-1}, f_{m-2}, \ldots, f_0]$ and an induced parameter $F'=[f'_{m-1}, f'_{m-2}, \ldots, f'_0]$ on standard basis, the elements C and D are respectively represented by $[c_{m-1}, c_{m-2}, \ldots, c_0]$ and $[d_{m-1}, d_{m-2}, \ldots, d_0]$ on standard basis, the arithmetic operation CD is performed when $f'_i=0$, the arithmetic operation $CD^2$ is performed when $f'_i=f_{m-1}*f_i+f_{i-1}$ ($1<=i<=m-1$) and $f'_0=f_{m-1}*f_0$ where m is a positive integer, and the calculating processor comprises:

an array of m×m identity cells, each having an input terminal D, an input terminal F, an input terminal F', an input terminal Carry1, an input terminal Carry2, an output terminal Carry1, an output terminal Carry2, an input terminal t, an output terminal t, a row control signal q, an input terminal p, an input terminal q, an output terminal p, an output terminal q and a control signal terminal, wherein the [i,j] identity cell has its input terminal D connected to the signal d, its input terminal F connected to the signal $f_i$, its input terminal F' connected to the signal $f'_i$, its input terminal Carry1 connected to the output terminal Carry1 of the [i+1,j] identity cell, its input terminal Carry2 connected to the output terminal Carry2 of the [i+1,j] identity cell, its input terminal t connected to the output terminal t of the [i−1,j] identity cell, its input terminal p connected to the output terminal p of the [i,j−1] identity cell, its input terminal q connected to the output terminal q of the [i,j−1] identity cell, its row control terminal q connected to the output terminal q of the [i−1,j−1] identity cell, its output terminals p and q outputting $q[i, j-1]*d_j+p[i, j-1]$ and $q[m-1,j-1]*f_i+q[i-1,j-1]$ when its control signal is connected to a logic 0 and outputting $q[i,j-1]*d_j+p[i,j-1]$ and $q[m-2,j-1]*f_i+q[m-1,j-1]*f'_i+q[i-2,j-1]$ when its control signal is connected to a logic 1, the [i,0] identity cell has its input terminal q connected to the signal $c_i$, the [i,0] identity cell has its input terminal p connected to the logic 0, the [0,j] identity cell has its row control terminal q and its input terminal t connected to the logic 0, and the [m−1,0] identity cell has its output terminal t connected to the input terminal Carry1 and its input terminal q connected to the input terminal Carry2, thereby forming two feedback loops.

5. The arithmetic processor as claimed in claim 4, wherein each identity cell is a combinational circuit of logic gates.

6. The arithmetic processor as claimed in claim 4, wherein each identity cell comprises:

a multiplexer having a control terminal connected to the control signal of the identity cell, two input terminals respectively connected to the input terminal q of the identity cell and the row control terminal q of the identity cell, and an output terminal connected to the output terminal t of the identity cell;

a first AND gate having two inputs respectively connected to the input terminals q and D of the identity cell;

a second AND gate having two inputs respectively connected to the input terminal F and the input terminal carry1 of the identity cell;

a third AND gate having two inputs respectively connected to the input terminal F' and the input terminal carry2 of the identity cell;

a first XOR gate having two inputs respectively connected to the input terminal p of the identity cell and the output of the first AND gate, and an output connected to the output terminal p of the identity cell; and a second XOR gate having three inputs respectively connected to the input terminal t of the identity cell, the outputs of the second and the third AND gates, and an output connected to the output terminal q of the identity cell.

7. The arithmetic processor as claimed in claim 1, wherein the finite field $GF(2^m)$ corresponds to a primitive polynomial F represented by $[f_{m-1}, f_{m-2}, \ldots, f_0]$ and an induced parameter $F'=[f'_{m-1}, f'_{m-2}, \ldots, f'_0]$ on standard basis, the elements C and D are respectively represented by $[c_{m-1}, c_{m-2}, \ldots, c_0]$ and $[d_{m-1}, d_{m-2}, \ldots, d_0]$ on standard basis, the arithmetic operation CD is performed when $f'_i=0$, the arithmetic operation $CD^2$ is performed when $f'_i=f_{m-1}*f_i+f_{i-1}$ ($1<i<m-1$) and $f'_0=f_{m-1}*f_0$ where m is a positive integer, represents the degree of $GF(2^m)$, and the calculator can be extended to a general calculating processor for all finite field m<M, where M is positive integer, which comprises:

an array of M×M identity cells, each having an input terminal D, an input terminal F, an input terminal F', a row control signal q, an input terminal Carry1, an input terminal Carry2, an output terminal Carry1, an output terminal Carry2, an input terminal t, an output terminal t, an input terminal m, an input terminal p, an input terminal q, an output terminal p, an output terminal q and a control signal terminal, wherein the [i,k] identity cell has its input terminal D connected to the signal $d_k$, its input terminal F connected to the signal $f_i$, its input terminal F' connected to the signal $f'_i$, its input terminal p connected to the output terminal p of the [i,k−1] identity cell, its input terminal q connected to the output terminal q of the [i,k−1] identity cell, its input terminal Carry1 connected to the output terminal Carry1 of the [i+1,k] identity cell, its input terminal Carry2 connected to the output terminal Carry2 of the [i+1,k] identity cell, its input terminal m connected to a size-control signal indicating the size of the finite field, its input terminal t connected to the output terminal t of the [i−1,k] identity cell, its row control terminal q connected to the output terminal q of the [i−1,k−1] identity cell, its output terminals p and q outputting q[i,k−1]*$d_k$+p[i,k−1] and q[m−1,k−1]*$f_i$+q[i−1,k−1] when its control signal is connected to a logic 0 and outputting q[i,k−1]*$d_k$+p[i,k−1] and q[m−1,k−1]*$f_i$+q[m−2,k−1]*$f'_i$+q[i−2,k−1] when its control signal is connected to a logic 1, the [i,0] identity cell has its input terminal q connected to the signal $c_i$, the [i, 0] identity cell has its input terminal p connected to the logic 0, the [0,k] identity cell has its row control terminal q and its input terminal t connected to the logic 0, the [M−1,0] identity cell has its output terminal t connected to the input terminal Carry1 and its input terminal q connected to the input terminal Carry2, thereby forming two feedback loops.

8. The arithmetic processor as claimed in claim 7, further comprising a size controller and a polynomial generator, for determining the size of the finite field and the coefficients of the primitive polynomial.

9. The arithmetic processor as claimed in claim 7, wherein each identity cell is a combinational circuit of logic gates.

10. The arithmetic processor as claimed in claim 9, wherein each identity cell comprises:

a multiplexer having a control terminal connected to the control signal of the identity cell, two input terminals respectively connected to the input terminal q of the identity cell and the row control terminal q of the identity cell, and an output connected to the output terminal t of the identity cell;

a first multiplexer having a control terminal connected to a size-control signal indicating the size of the finite field, two input terminals respectively connected to the output of the multiplexer of the identity cell and the input terminal Carry1 of the identity cell, and an output terminal connected to the output terminal Carry1 of the identity cell;

a second multiplexer having a control terminal connected to the size signal, two input terminals respectively connected to the input terminals q and Carry2 of the identity cell, and an output terminal connected to the output terminal Carry2 of the identity cell;

a first AND gate having two inputs respectively connected to the input terminals q and D of the identity cell;

a second AND gate having two inputs respectively connected to the input terminal F and the output terminal of the first multiplexer;

a third AND gate having two inputs respectively connected to the input terminal F and the output terminal of the second multiplexer;

a first XOR gate having two inputs respectively connected to the input terminal p of the identity cell and the output of the first AND gate, and an output connected to the output terminal p of the identity cell; and a second XOR gate having three inputs respectively connected to the input terminal t of the identity cell and outputs of the second and the third AND gates, and an output connected to the output terminal q of the identity cell.

* * * * *